(12) United States Patent
Qiao et al.

(10) Patent No.: US 12,401,977 B2
(45) Date of Patent: Aug. 26, 2025

(54) COMMUNICATION METHOD, APPARATUS, AND DEVICE, SPACE-BASED PLATFORM, AND STORAGE MEDIUM

(71) Applicant: HUAWEI TECHNOLOGIES CO., LTD., Guangdong (CN)

(72) Inventors: Yunfei Qiao, Hangzhou (CN); Yinggang Du, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 375 days.

(21) Appl. No.: 17/370,878

(22) Filed: Jul. 8, 2021

(65) Prior Publication Data
US 2021/0337368 A1    Oct. 28, 2021

Related U.S. Application Data

(63) Continuation of application No. PCT/CN2019/122140, filed on Nov. 29, 2019.

(30) Foreign Application Priority Data

Jan. 11, 2019 (CN) .......................... 201910027875.3

(51) Int. Cl.
H04W 4/70 (2018.01)
H04W 76/14 (2018.01)
H04W 84/06 (2009.01)

(52) U.S. Cl.
CPC .............. *H04W 4/70* (2018.02); *H04W 76/14* (2018.02); *H04W 84/06* (2013.01)

(58) Field of Classification Search
CPC ....... H04W 4/70; H04W 76/14; H04W 84/06; H04W 4/021; H04W 76/10; H04B 7/18504; H04B 7/18506
See application file for complete search history.

(56) References Cited

U.S. PATENT DOCUMENTS 9,471,064 B1  10/2016  Boland et al.
9,836,049 B1  12/2017  Tu
(Continued)

FOREIGN PATENT DOCUMENTS

CN  102257859 A  11/2011
CN  106549705 A  3/2017
(Continued)

OTHER PUBLICATIONS

Extended European Search Report issued in European Application No. 19908366.8 on Jan. 10, 2022, 7 pages.
(Continued)

*Primary Examiner* — Ivan O Latorre
(74) *Attorney, Agent, or Firm* — Fish & Richardson P.C.

(57) ABSTRACT

The present disclosure relates to communication methods, apparatus, devices, space-based platforms, and storage medium. In one example method, a space-based platform establishes, based on a preset time rule, a communication connection with a machine type communications (MTC) device located in a first area. After the communication connection is established, the MTC device sends first information to the space-based platform, so that the space-based platform sends the first information to a communications device located in a second area.

20 Claims, 19 Drawing Sheets

(56) References Cited

U.S. PATENT DOCUMENTS

| | | | |
|---|---|---|---|
| 2015/0373558 A1* | 12/2015 | Weisbrod | H04W 4/90 |
| | | | 455/404.1 |
| 2017/0041978 A1* | 2/2017 | Radhakrishnan | H04W 16/26 |
| 2017/0111780 A1* | 4/2017 | Rico Alvarino | H04W 56/001 |
| 2017/0146990 A1 | 5/2017 | Wang et al. | |
| 2017/0222712 A1 | 8/2017 | Chang | |
| 2017/0302368 A1 | 10/2017 | Trott | |
| 2018/0343052 A1* | 11/2018 | Lv | H04B 7/18513 |
| 2019/0102730 A1* | 4/2019 | Giorgi | H04W 4/70 |
| 2019/0150167 A1* | 5/2019 | Lee | B64C 39/024 |
| | | | 705/7.24 |
| 2022/0030511 A1* | 1/2022 | Wang | H04L 45/302 |

FOREIGN PATENT DOCUMENTS

| | | | | |
|---|---|---|---|---|
| CN | 107027090 A | 8/2017 | | |
| CN | 107204847 A | 9/2017 | | |
| CN | 108111214 A | 6/2018 | | |
| CN | 108141740 A | 6/2018 | | |
| CN | 108736957 A | 11/2018 | | |
| CN | 109151793 A | 1/2019 | | |
| WO | 2004004157 A2 | 1/2004 | | |
| WO | WO-2017133186 A1 * | 8/2017 | | H04B 7/18504 |
| WO | 2018071453 A1 | 4/2018 | | |
| WO | WO-2018094950 A1 * | 5/2018 | | H04B 7/18504 |
| WO | 2018136370 A2 | 7/2018 | | |

OTHER PUBLICATIONS

Office Action issued in Chinese Application No. 201910027875.3 on Jan. 22, 2021, 47 pages (with English translation).

PCT International Search Report and Written Opinion issued in International Application No. PCT/CN2019/122140 on Feb. 21, 2020, 15 pages (with English translation).

EP Communication Pursuant to Article 94(3) EPC in European Appln No. 19908366.8, dated Jun. 5, 2024, 5 pages.

* cited by examiner

COMMUNICATION METHOD, APPARATUS, AND DEVICE, SPACE-BASED PLATFORM, AND STORAGE MEDIUM

CROSS-REFERENCE TO RELATED APPLICATIONS

This application is a continuation of International Application No. PCT/CN2019/122140, filed on Nov. 29, 2019, which claims priority to Chinese Patent Application No. 201910027875.3, filed on Jan. 11, 2019. The disclosures of the aforementioned applications are hereby incorporated by reference in their entireties.

TECHNICAL FIELD

This application relates to the field of communications technologies and, in particular, to a communication method, apparatus, and device, a space-based platform, and a storage medium.

BACKGROUND

To cope with the explosive growth of mobile data traffic in the future, the massive mobile communications device connections, and the emerging new services and application scenarios, a new mobile communications system emerges. A future mobile communications system defines three types of application scenarios: enhanced mobile broadband (eMBB), ultra reliable and low latency communications (URLLC), and massive machine type communications (mMTC). The feature of the mMTC is to support communication of a large quantity of machine types. In an mMTC scenario, a maximum quantity of wireless connections may reach millions. A wireless node generally sends a small amount of information each time, has relatively low power consumption, and needs to support a large communication range. Applications of the wireless node cover scenarios such as a smart city, public utilities, and logistics support.

However, in some specific scenarios, for example, remote areas such as deserts, forests, oceans, and mountains, to ensure that deployed MTC devices access a network, a large quantity of access points and a large quantity of fiber-optic networks need to be deployed, and construction costs and later maintenance costs are high.

SUMMARY

Embodiments of this application provide a communication method, apparatus, and device, a space-based platform, and a storage medium, to reduce communication costs while ensuring reliable communication between an MTC device in a first area and a communications device in a second area.

According to a first aspect, an embodiment of this application provides a communication method, including:

An MTC device establishes a communication connection with a space-based platform based on a preset time rule, where the MTC device is located in a first area; and after the communication connection is established, the MTC device sends first information to the space-based platform, so that the space-based platform sends the first information to a communications device located in a second area. In this application, the space-based platform establishes, based on the preset time rule, the communication connection with the MTC device located in the first area. Compared with an existing solution in which the space-based platform is always connected to the MTC device, this application can effectively avoid a problem of resource waste caused by an invalid communication connection between the space-based platform and the MTC device, and improve flexible arrangement of the space-based platform.

In an implementation, the space-based platform may further receive second information from the communications device in the second area, and send the second information to the MTC device in the first area, to establish bidirectional communication between the communications device and the MTC device, thereby further improving communication reliability.

Optionally, at least a part of the first area is located outside network coverage of the second area, so that the MTC device in the first area may communicate with the communications device located in the second area by using the space-based platform.

In an implementation, the space-based platform may move between the first area and the second area, so that when the first area is relatively far from the second area, communication between the two areas can also be implemented. For example, after receiving, in the first area, the first information sent by the MTC device, the space-based platform moves from the first area to the second area, sends the first information to the communications device in the second area, or the space-based platform receives, in the second area, second information sent by the communications device, moves from the second area to the first area, and sends the second information to the MTC device, to implement long-distance data transmission.

Optionally, the first information includes information received by the MTC device from at least one other MTC device.

Optionally, the preset time rule includes either of a preset time periodicity and a time interval at which the MTC device sends the first information. In other words, the space-based platform sends the first information based on a preset time periodicity or a time interval at which the MTC device sends the first information. Establishing the communication connection with the MTC device located in the first area not only ensures the communication connection with the MTC device when required, but also can effectively avoid a problem of resource waste caused by an invalid communication connection between the space-based platform and the MTC device.

According to a second aspect, an embodiment of this application provides a communication method, including:

A space-based platform establishes a communication connection with an MTC device based on a preset time rule, where the MTC device is located in a first area; and after the communication connection is established, the space-based platform receives first information from the MTC device, and sends the first information to a communications device located in a second area. In this way, while reliable communication between the MTC device and the communications device is ensured, a problem of resource waste caused by an invalid communication connection between the space-based platform and the MTC device can be effectively avoided, and flexible arrangement of the space-based platform can be improved.

In an implementation, the space-based platform may further receive second information from the communications device, and send the second information to the MTC device.

Optionally, at least a part of the first area is located outside network coverage of the second area.

Optionally, the space-based platform moves between the first area and the second area.

Optionally, the space-based platform is any one of an unmanned aerial vehicle, a balloon, a glider, an airship, a helicopter, and a satellite.

In an implementation, if the space-based platform is located outside the first area, the space-based platform moves to the first area based on the preset time rule.

Optionally, the preset time rule includes either of a preset time periodicity and a time interval at which the MTC device sends the first information.

Optionally, the space-based platform moves under control of a space-based platform control station. For example, the space-based platform control station sends a flight instruction to the space-based platform, and the space-based platform flies based on the flight instruction.

in an implementation, that the space-based platform sends the first information to a communications device may include: The space-based platform sends the first information to the space-based platform control station, so that the space-based platform control station forwards the first information to the communications device.

Similarly, that the space-based platform receives second information from the communications device may include: The space-based platform receives the second information from the space-based platform control station, where the space-based platform control station stores the second information received from the communications device.

Optionally, the space-based platform control station may be the communications device in the second area.

Optionally, the space-based platform control station includes any one of a relay station, a ground station, a flight device, and a communications device.

According to a third aspect, an embodiment of this application provides a communications apparatus, applied to an MTC device. The apparatus is configured to perform the communication method according to the first aspect, and the apparatus includes:

a processing unit, configured to establish a communication connection with a space-based platform based on a preset time rule, where the MTC device is located in a first area; and a sending unit, configured to send first information to the space-based platform, so that the space-based platform sends the first information to a communications device located in a second area.

In an implementation, the apparatus further includes a receiving unit, where the receiving unit is configured to receive second information from the space-based platform, and the second information is received by the space-based platform from the communications device.

Optionally, at least a part of the first area is located outside network coverage of the second area.

In an implementation, the space-based platform moves between the first area and the second area.

Optionally, the first information includes information received by the MTC device from at least one other MTC device.

Optionally, the preset time rule includes either of a preset time periodicity and a tune interval at which the MTC device sends the first information.

According to a fourth aspect, an embodiment of this application provides a communications apparatus, applied to a space-based platform. The apparatus is configured to perform the communication method according to the second aspect, and the apparatus includes:

a processing unit, configured to establish a communication connection with the MTC device based on a preset time rule, where the MTC device is located in a first area;

a receiving unit, configured to receive first information from the MTC device; and a sending unit, configured to send the first information to a communications device, where the communications device is located in a second area.

In an implementation, the receiving unit is further configured to receive second information from the communications device; and the sending unit is further configured to send the second information to the MTC device.

Optionally, at least a part of the first area is located outside network coverage of the second area.

Optionally, the space-based platform moves between the first area and the second area.

Optionally, the space-based platform is any one of an unmanned aerial vehicle, a balloon, a glider, an airship, a helicopter, and a satellite.

In an implementation, the processing unit is further configured to control, based on the preset time rule, the space-based platform to move to the first area.

Optionally, the preset time rule includes either of a preset time periodicity and a time interval at which the MTC device sends the first information.

In an implementation, the processing unit is further configured to: receive a move instruction sent by the space-based platform control station, and control, based on the move instruction, the space-based platform to move.

In an implementation, the sending unit is further configured to send the first information to the space-based platform control station, so that the space-based platform control station forwards the first information to the communications device; and the receiving unit is further configured to receive the second information from the space-based platform control station, where the space-based platform control station stores the second information received from the communications device.

Optionally, the space-based platform control station is the communications device.

Optionally, the space-based platform control station includes any one of a relay station, a ground station, a flight device, and a communications device.

According to a fifth aspect, an embodiment of this application provides a communications device. The communications device includes a processor and a transceiver, and the processor and the transceiver are configured to perform the communication method according to either of the first aspect and the second aspect.

According to a sixth aspect, an embodiment of this application provides an apparatus. The apparatus exists in a product form of a chip. A structure of the apparatus includes a processor and a memory. The memory is configured to be coupled to the processor, and store a program instruction and data that are necessary for the apparatus. The processor is configured to execute the program instruction stored in the memory, so that the apparatus performs functions of the MTC device in the foregoing method.

According to a seventh aspect, an embodiment of this application provides an MTC device. The MTC device can implement functions performed by the MTC device in the foregoing method embodiments, and the functions may be implemented by hardware, or may be implemented by hardware by executing corresponding software. The hardware or software includes one or more modules or units corresponding to the foregoing functions.

In a possible design, a structure of the MTC device includes a processor and a transceiver. The processor is configured to support the MTC device in performing corresponding functions in the foregoing method. The transceiver is configured to support communication between the MTC device and another MTC device or space-based platform. The MTC device may further include a memory. The memory is configured to be coupled to the processor, and stores a program instruction and data that are necessary for the MTC device.

According to an eighth aspect, an embodiment of this application provides an apparatus. The apparatus exists in a product form of a chip. A structure of the apparatus includes a processor and a memory. The memory is configured to be coupled to the processor, and store a program instruction and data that are necessary for the apparatus. The processor is configured to execute the program instruction stored in the memory, so that the apparatus performs functions of the space-based platform in the foregoing method.

According to a ninth aspect, an embodiment of this application provides a space-based platform. The space-based platform can implement functions performed by the space-based platform in the foregoing method embodiments, and the functions may be implemented by hardware, or may be implemented by hardware by executing corresponding software. The hardware or software includes one or more modules or units corresponding to the foregoing functions.

In a possible design, a structure of the space-based platform includes a processor and a communications interface. The processor is configured to support the space-based platform in performing corresponding functions in the foregoing method. The communications interface is configured to support communication between the space-based platform and another network element. The space-based platform may further include a memory. The memory is configured to be coupled to the processor, and stores a program instruction and data that are necessary for the space-based platform.

In a possible implementation, the structure of the space-based platform further includes a flight system, and the flight system is configured to control the space-based platform to move, According to a tenth aspect, an embodiment of this application provides a computer storage medium. The storage medium includes a computer instruction, and when the instruction is executed by a computer, the computer is caused to implement the communication method according to either of the first aspect and the second aspect.

According to an eleventh aspect, an embodiment of this application provides a computer program product. The program product includes a computer program. The computer program is stored in a readable storage medium. At least one processor of a communications apparatus can read the computer program from the readable storage medium. The at least one processor executes the computer program, so that the communications apparatus performs the communication method according to either of the first aspect and the second aspect.

According to a twelfth aspect, an embodiment of this application provides a communications system. The system includes the foregoing MTC device and space-based platform.

According to the communication method, apparatus, and device, the space-based platform, and the storage medium provided in some embodiments of this application, a space-based platform establishes, based on a preset time rule, a communication connection with an MTC device located in a first area, and after the communication connection is established, the MTC device sends first information to the space-based platform, so that the space-based platform sends the first information to a communications device located in a second area. In this application, the space-based platform establishes, based on the preset time rule, the communication connection with the MTC device located in the first area. Compared with an existing solution in which the space-based platform is always connected to the MTC device, this application can effectively avoid a problem of resource waste caused by an invalid communication connection between the space-based platform and the MTC device, and improve flexible arrangement of the space-based platform.

DESCRIPTION OF EMBODIMENTS

For ease of understanding the embodiments of this application, related concepts in the embodiments of this application are first briefly described as follows.

mMTC is one of the three typical services supported by 5G. Typical mMTC services include smart grid power distribution automation, a smart city, and the like. Mainly features of the mMTC are a huge quantity of connected devices, a relatively small amount of data to be transmitted, and data being insensitive to transmission latency.

An MTC device is a device that supports an mMTC service. A data sending interval of the MTC device is relatively long, for example, once every day, every month, or even every year. Data packets are relatively small, and are mostly between several bits and hundreds of bits. The MTC device may be a wireless device or a wired device. The wireless device may be a device with a wireless transceiver function, and may be deployed on land, including an indoor device, an outdoor device, a handheld device, or an in-vehicle device. Alternatively, the MTC device may be deployed on water (for example, a ship); or may be deployed in air (for example, on an airplane, a balloon, or a satellite). The MTC device may be a mobile phone, a tablet computer (Pad), a computer with a wireless transceiver function, or a virtual reality (VR) terminal device, an augmented reality (AR) terminal device, a wireless device in industrial control, a wireless device in self-driving, a wireless device in remote medical, a wireless device in a smart grid, a wireless device in transportation safety, a wireless device in a smart city, a wireless device in a smart home, or the like. This is not limited herein.

A space-based platform is an air base station that forwards radio signals between a plurality of areas.

Figure 1:
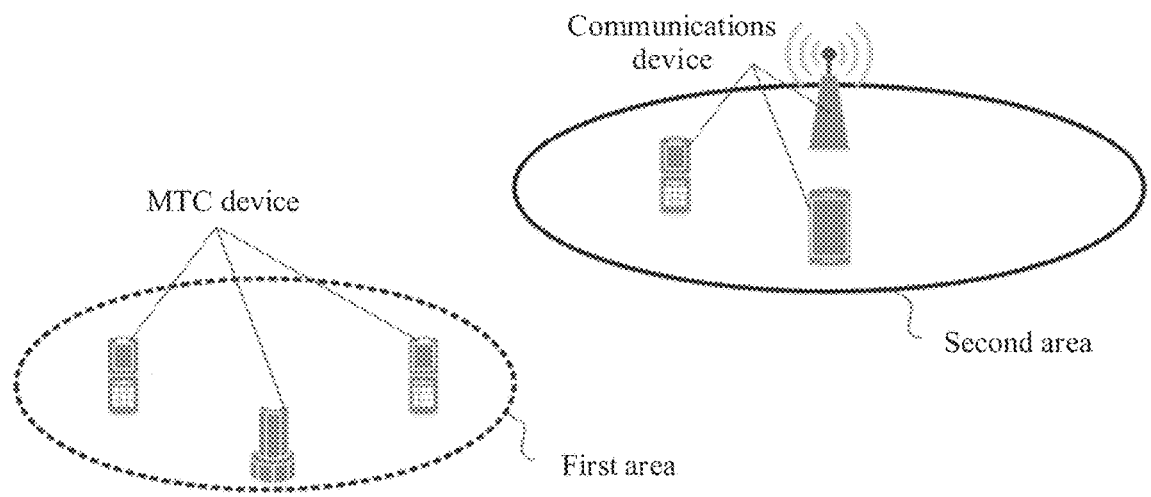
FIG. 1 is a diagram of an application scenario according to an embodiment of this application.

FIG. 1 is a diagram of an application scenario according to an embodiment of this application. As shown in FIG. 1, a first area is an area in which an MTC device is located, and a second area is a cellular network coverage area. The MTC device in the first area cannot directly communicate with a communications device in the second area, or quality of a communication signal between the first area and the second area is relatively weak. In other words, at least a part of the first area is located outside network coverage of the second area.

Optionally, the first area may be an area in which network coverage is incomplete, such as a desert, a forest, an ocean, or a mountain, or a disaster area in which a network is damaged.

A communications system in the second area includes but is not limited to a 2G, 3G, 4G, or 5G communications system or a next generation communications system, for example, a global system for mobile communications (GSM), a code division multiple access (CDMA) system, a time division multiple access (TDMA) system, a wideband code division multiple access (WCDMA) system, a frequency division multiple access (FDMA) system, an orthogonal frequency-division multiple access (OFDMA) system, a single-carrier FDMA (SC-FDMA) system, a general packet radio service (GPRS) system, a long term evolution (LTE) system, or a new radio (NR) communications system.

The communications device in the second area includes a terminal device and/or a network device. The terminal device may be a wireless terminal device or a wired terminal device. The wireless terminal device may be a terminal device with a wireless transceiver function, and may be deployed on land, including an indoor terminal, an outdoor terminal, a handheld terminal, or an in-vehicle terminal. Alternatively, the terminal device may be deployed on water (for example, a ship), or may be deployed in air (for example, on an airplane, a balloon, or a satellite). The terminal device may be a mobile phone, a tablet computer, a computer with a wireless transceiver function, a VR terminal device, an AR terminal device, a wireless device in industrial control, a wireless device in self-driving, a wireless terminal device in remote medical, a wireless terminal device in a power grid, a wireless terminal device in transportation safety, a wireless terminal device in a smart city, a wireless terminal device in a smart home, or the like. This is not limited herein.

The network device is a device in a wireless network, for example, a radio access network (RAN) node that connects a terminal to the wireless network. Currently, some examples of the RAN node are: a gNB, a transmission reception point (TRP), an evolved node B (eNB), a radio network controller (RNC), and a node B (NB), a base station controller (BSC), a base transceiver station (BTS), a home base station (for example, a home evolved NodeB, or a home Node B, HNB), a base band unit (BBU), a wireless fidelity (Wi-Fi) access point (AP), and the like. In a network structure, the network device may include a centralized unit (CU) node, a distributed unit (DU) node, or a RAN device including a CU node and a DU node. This is not limited herein.

The following describes the technical solutions in the embodiments of this application with reference to the accompanying drawings in the embodiments of this application. In the descriptions of this application, "a plurality of" means two or more than two.

In addition, for ease of clearly describing the technical solutions in the embodiments of this application, words such as "first" and "second" in the embodiments of this application are used to distinguish same items or similar items whose functions and effects are basically the same. A person skilled in the art may understand that the words "first" and "second" do not limit a quantity and an execution order, and the words "first" and "second" do not necessarily limit a difference.

Figure 2:
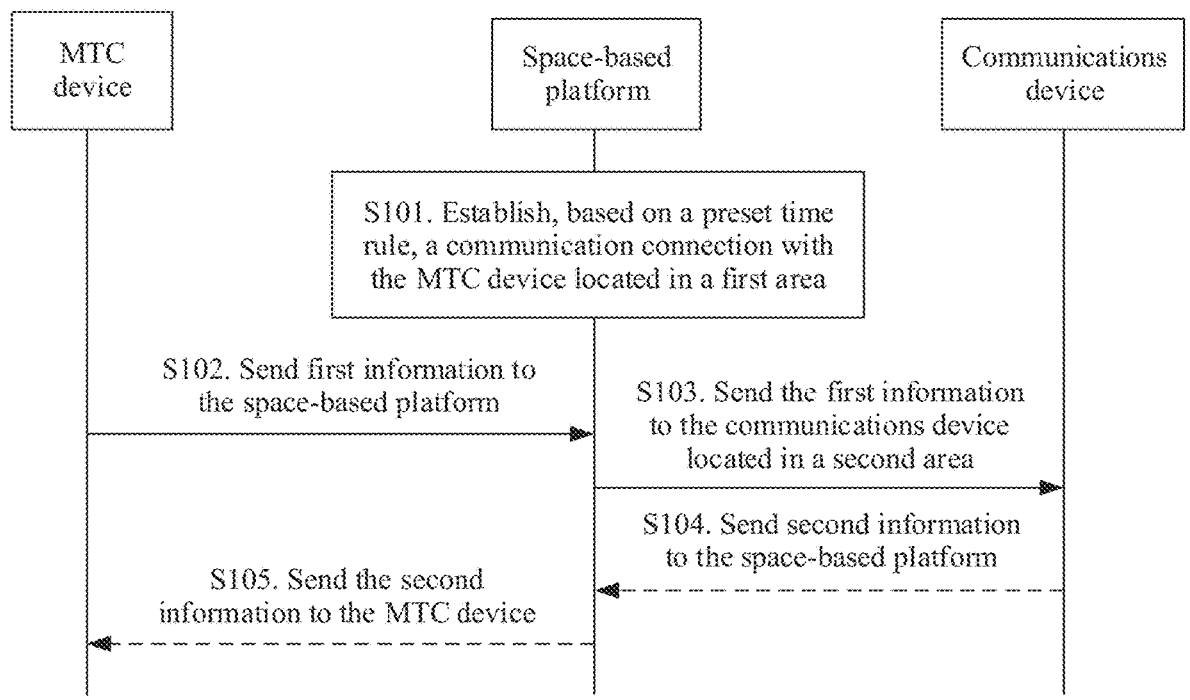
FIG. 2 is a flowchart of a communication method according to an embodiment of this application.

FIG. 2 is a flowchart of a communication method according to an embodiment of this application. In this embodiment of this application, a space-based platform is disposed between a first area and a second area, and the space-based platform forwards data between the first area and the second area. As shown in FIG. 2, the method in this embodiment of this application includes the following steps.

S101. The space-based platform establishes, based on a preset time rule, a communication connection with an MTC device located in the first area.

The first area in this embodiment of this application may include one or more MTC devices, and the space-based platform may establish a communication connection with each MTC device in the first area; or the space-based platform establishes communication connections with some MTC devices in the first area; or the space-based platform establishes a communication connection with an MTC device 1 in the first area, and another MTC device in the first area establishes a communication connection with the MTC device 1.

Optionally, in this embodiment of this application, one space-based platform may be disposed in the first area, and the space-based platform establishes a communication connection with one or more MTC devices in the first area based on the preset time rule.

Optionally, in this embodiment of this application, a plurality of space-based platforms may be alternatively disposed in the first area, and each space-based platform is responsible for establishing a communication connection with an MTC device in a partial range of the first area. For example, three space-based platforms are disposed in the first area, the first area includes three sub-areas, and the three space-based platforms separately establish communication connections with MTC devices in the three sub-areas based on a preset time rule. Specifically, a first space-based platform establishes a communication connection with an MTC device in a first sub-area based on a preset actual rule, a second space-based platform establishes a communication connection with an MTC device in a second sub-area based on the preset actual rule, and a third space-based platform establishes a communication connection with an MTC device in a third sub-area based on the preset actual rule.

Optionally, to improve data transmission reliability, data may be forwarded between the first area and the second area by using a plurality of space-based platforms. For example, for one MTC device, two space-based platforms establish communication connections with the MTC device, so that when one of the space-based platforms is faulty, the other space-based platform can implement data forwarding between the MTC device and a communications device, thereby improving data forwarding reliability.

Figure 3:
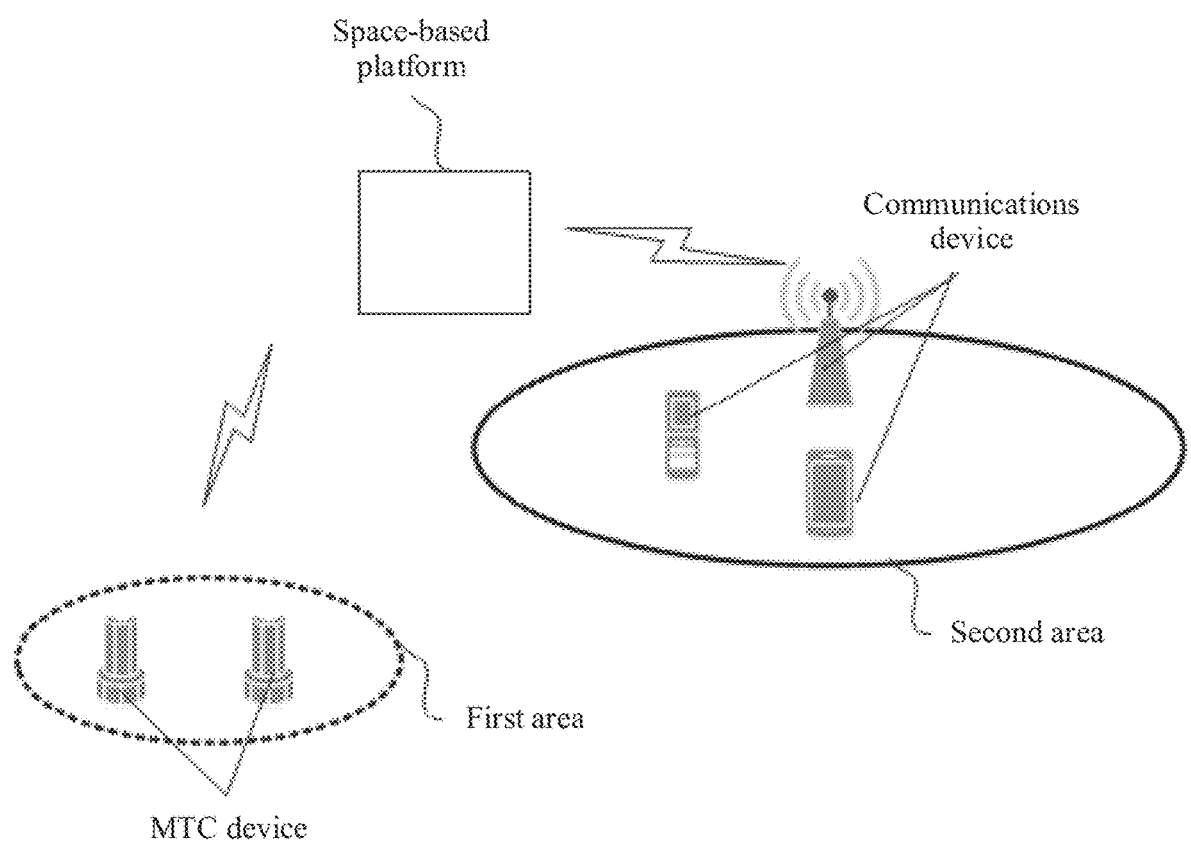
FIG. 3 is a schematic diagram of a scenario according to an embodiment of this application.

In an implementation, as shown in FIG. 3, the space-based platform may be fixedly disposed in air, and does not move between the first area and the second area. For example, the space-based platform is a balloon fixedly disposed in air, and the balloon establishes a communication connection with the MTC device in the first area based on a preset time rule.

Figure 4:
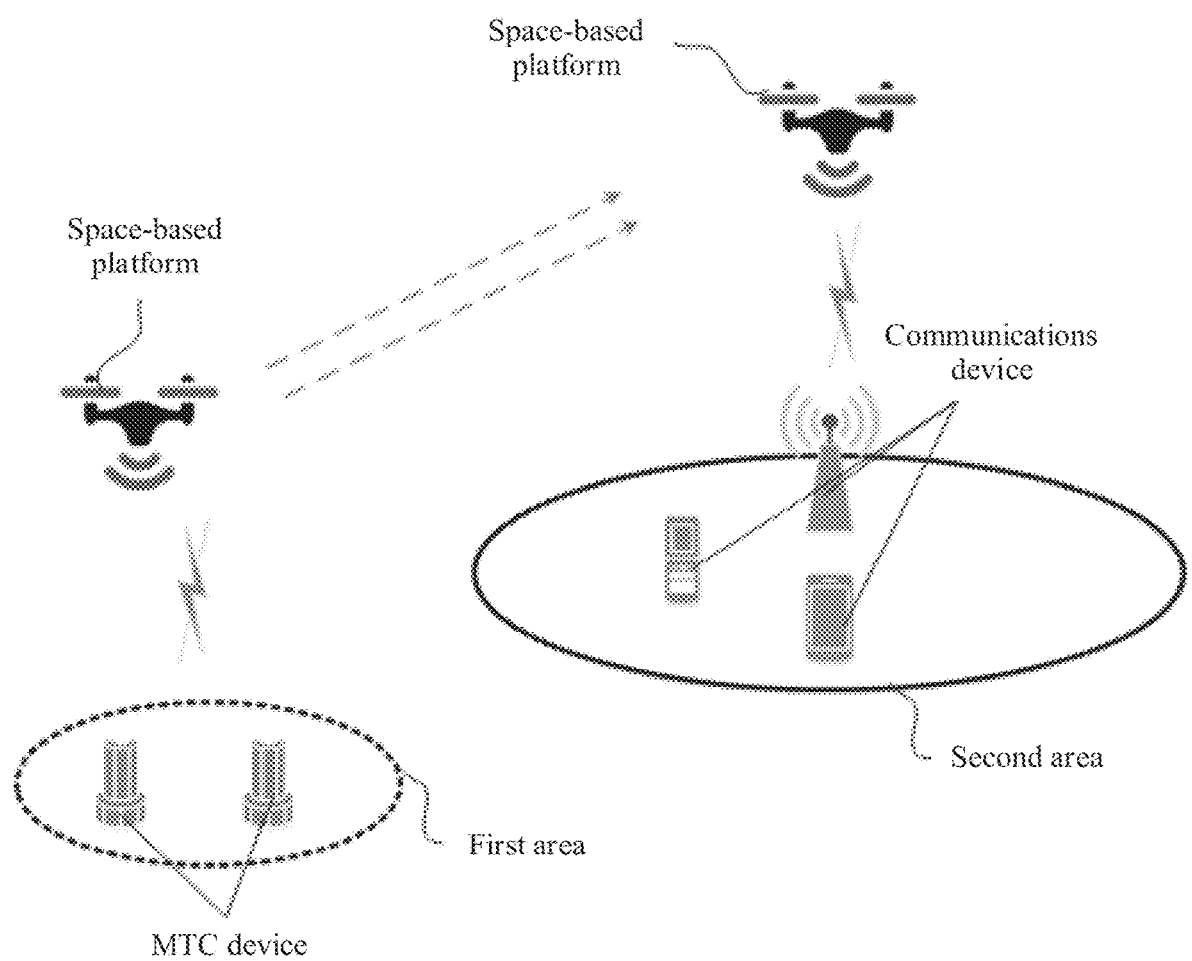
FIG. 4 is a schematic diagram of another scenario according to an embodiment of this application.

In another implementation, as shown in FIG. 4, the space-based platform may move between the first area and the second area. It should be noted that, in FIG. 4, an example in which the space-based platform is an unmanned aerial vehicle is used for illustration. However, the space-based platform in this embodiment of this application is not limited to an unmanned aerial vehicle, and may alternatively be a flight device that can move between the first area and the second area, such as a balloon, a glider, an airship, a helicopter, or a satellite.

When the space-based platform is a flight device, the space-based platform has a parking base, and when the space-based platform does not forward data between the first area and the second area, the space-based platform may be parked in the parking base. Optionally, the parking base may be located in the first area or the second area. Optionally, the parking base may alternatively be located in an area outside the first area and the second area. A specific location of the parking base is not limited in this embodiment of this application, and is specifically determined based on an actual requirement.

In actual use, if the parking base is located in the first area, namely, when the space-based platform is parked in the first area, the space-based platform establishes a communication connection with at least one MTC device in the first area based on a preset time rule. If the parking base is located in an area outside the first area, namely, when the space-based platform is parked outside the first area, the space-based platform takes off from the parking base based on a preset time rule, moves to the first area, and establishes a communication connection with at least one MTC device in the first area.

The preset time rule includes any one of a preset time periodicity, a time interval at which the MTC device sends first information, and a time interval at which the communications device receives the first information.

For example, the preset time rule is a preset time periodicity. Assuming that the preset time periodicity is 24 hours, the space-based platform establishes a communication connection with the MTC device once every 24 hours.

For another example, the preset time rule is a time interval at which the MTC device sends the first information, and the time interval at which the MTC device sends the first information is obtained in advance. Assuming that time intervals at which the MTC device sends the first information are the same, for example, the first information is sent once every 8 hours, the space-based platform establishes a communication connection with the MTC device once every 8 hours. Assuming that time intervals at which the MTC device sends the first information are different, the space-based platform determines, based on the time intervals at which the MTC device sends the first information, a time point at which the MTC device sends each piece of first information. When each time point arrives, the space-based platform establishes a communication connection with the MTC device. Herein, that the space-based platform establishes a communication connection with the MTC device when the sending time point of each piece of first information arrives may be understood as: The space-based platform completes the communication connection with the MTC device when the sending time point of each piece of first information arrives.

For another example, the preset time rule is a time interval at which the communications device receives the first information. Assuming that time intervals at which the communications device receives the first information are the same, for example, the first information is received once every 8 hours, the space-based platform establishes a communication connection with the MTC device once every 8 hours. Assuming that time intervals at which the communications device receives the first information are different, the space-based platform determines, based on the time intervals at which the communications device receives the first information, a time point at which the communications device receives each piece of first information. When each time point arrives, the space-based platform establishes a communication connection with the MTC device, receives the first information from the MTC device, and sends the first information to the communications device. Herein, a time at which the space-based platform establishes a communication connection with the MTC device needs to be determined based on a time interval at which the communications device receives the first information, a time required for connecting the space-based platform to the MTC device, and a time required for sending the first information to the communications device in the second area.

The space-based platform establishes the communication connection with the MTC device based on the preset time rule in S101 in at least two manners.

A first manner: The space-based platform itself establishes the communication connection with the MTC device based on the preset time rule. For example, the space-based platform itself stores the preset time rule, and a processor of the space-based platform controls, based on the preset time rule, a communications module in the space-based platform to establish the communication connection with the MTC device.

A second manner: The space-based platform is controlled by a space-based platform control station, and the space-based platform control station controls, based on the preset time rule, the space-based platform to establish the communication connection with the MTC device in the first area.

In this step, the space-based platform establishes the communication connection with the MTC device based on the preset time rule. In other words, the space-based platform establishes a connection with the MTC device only when the MTC device needs to communicate with the communications device Compared with an existing solution in which the space-based platform is connected to the MTC device, this application can effectively avoid a problem of resource waste caused by an invalid communication connection between the space-based platform and the MTC device. In addition, when the MTC device does not need to communicate with the communications device, the space-based platform may be used for other purposes, for example, may be used as a space-based platform in another area.

S102. The MTC device sends the first information to the space-based platform.

S103. The space-based platform sends the first information to a communications device located in the second area.

Based on the foregoing steps, after the space-based platform establishes a communication connection with the MTC device, the MTC device may send, to the space-based platform, first information that needs to be sent to the communications device. The space-based platform sends the first information to the communications device in the second area.

Optionally, that the space-based platform sends the first information to the communications device in the second area in S103 may be: The space-based platform directly sends the first information to the communications device. For example, the space-based platform moves from the first area to the second area, and sends the first information to the communications device in the second area.

Optionally, that the space-based platform sends the first information to the communications device in the second area in S103 may be: The space-based platform forwards the first information to the communications device in the second area by using another flight device. For example, the space-based platform sends the first information to another flight device, and when moving to the second area, the another flight device sends the first information to the communications device located in the second area.

Optionally, if the space-based platform is located in an overlapping area between the first area and the second area, namely, when the space-based platform is located in both the first area and the second area, the space-based platform may send the first information to the communications device in the second area in real time.

After the space-based platform sends the first information to the communications device in the second area, if the communications device has second information to be sent to the MTC device, the method in this embodiment of this application further includes:

S104. The communications device sends the second information to the space-based platform.

S105. The space-based platform sends the second information to the MTC device.

In an implementation of S104, after the space-based platform sends the first information to the communications device, if the communications device detects second information that needs to be sent to the MTC device, the communications device may send the second information to the space-based platform, so that the space-based platform sends the second information to the MTC device in the first area. A process of sending the second information may be understood as a reverse process of a process of sending the first information. For details, refer to the foregoing process of sending the first information.

In another implementation of S104, after the space-based platform sends the first information to the communications device, the communications device does not need to send the second information to the MTC device. After a period of time, the communications device needs to send the second information. In this case, if the communications device detects that the space-based platform and the communications device are in a communication connection state, the communications device sends the second information to the space-based platform, so that the space-based platform forwards the second information to the MTC device. If the communications device detects that the communication connection between the space-based platform and the communications device is in a disconnected state, the communications device first establishes a communication connection with the space-based platform, and after the communication connection is established, sends the second information to the space-based platform, so that the space-based platform forwards the second information to the MTC device.

It can be learned from the foregoing descriptions that, in the method in this embodiment of this application, a space-based platform establishes, based on a preset time rule, a communication connection with an MTC device located in a first area, and after the communication connection is established, the MTC device sends first information to the space-based platform, so that the space-based platform sends the first information to a communications device located in a second area. In addition, the space-based platform receives second information from the communications device, and sends the second information to the MTC device. In this application, the space-based platform establishes, based on the preset time rule, the communication connection with the MTC device located in the first area. Compared with an existing solution in which the space-based platform is always connected to the MTC device, this application can effectively avoid a problem of resource waste caused by an invalid communication connection between the space-based platform and the MTC device, and improve flexible arrangement of the space-based platform.

The following describes in detail the communication method provided in the embodiments of this application with reference to different examples.

Figure 5:
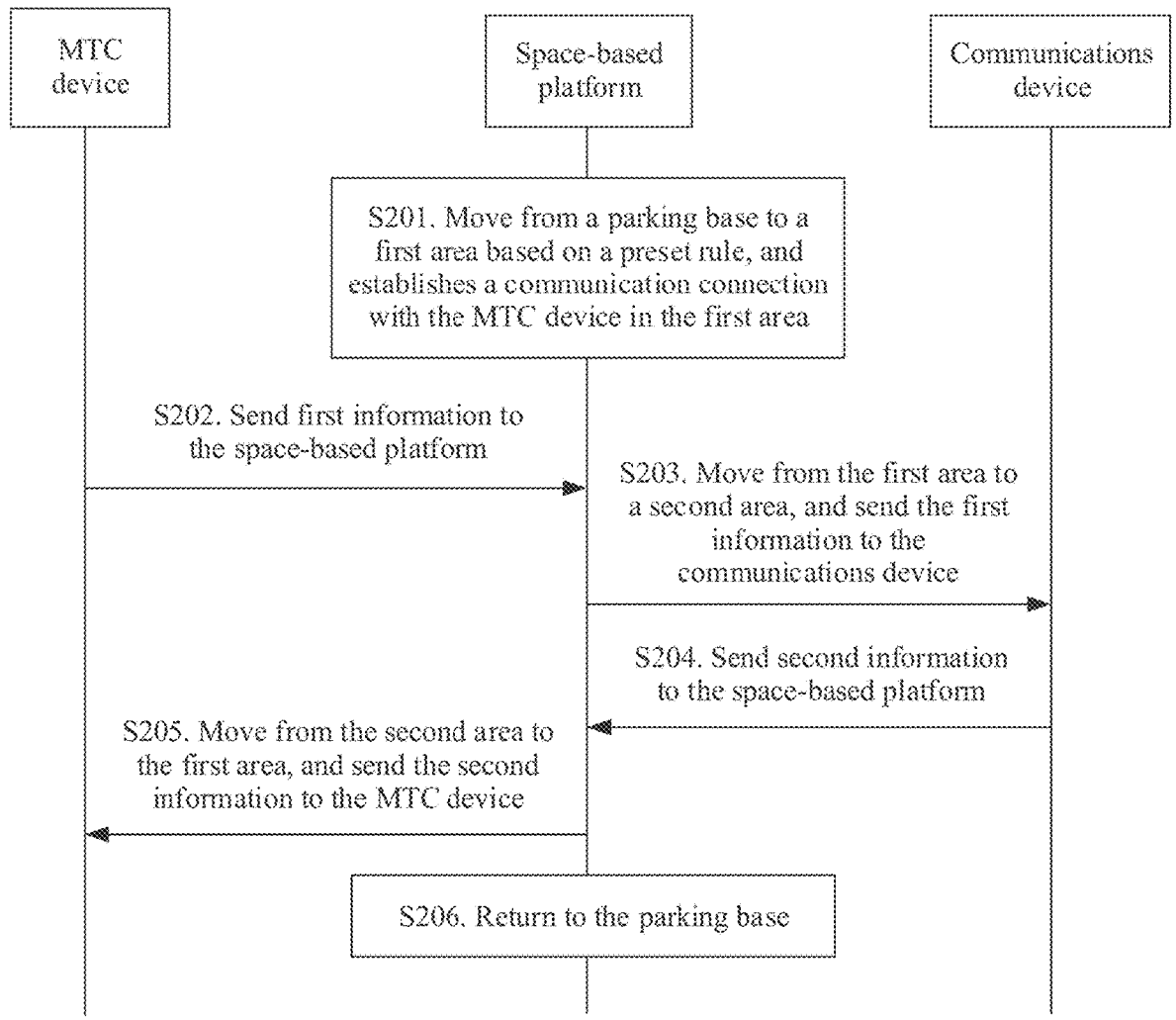
FIG. 5 is an example flowchart of a communication method according to an embodiment of this application.

Example 1: As shown in FIG. 4, the space-based platform shown in FIG. 4 is an unmanned aerial vehicle. Optionally, the space-based platform may alternatively be a flight device such as a balloon, a glider, an airship, or a helicopter. As shown in FIG. 5, a communication process in this embodiment is as follows.

S201. The space-based platform moves from a parking base to a first area based on a preset rule, and establishes a communication connection with an MTC device in the first area.

Optionally, if the parking base is located in the first area, the space-based platform in S201 does not need to move, and may establish a communication connection with the MTC device in the first area based on a preset rule.

S202. The MTC device sends first information to the space-based platform,

S203. The space-based platform moves from the first area to a second area, and sends the first information to a communications device.

S204. The communications device sends second information to the space-based platform.

S205. The space-based platform moves from the second area to the first area, and sends the second information to the MTC device.

S206. The space-based platform returns to the parking base.

In S206, after sending the second information to the MTC device, the space-based platform returns to the parking base, and repeats the foregoing steps based on a preset time rule.

For an execution process of S201 to S206, refer to specific descriptions of S101 to S105. Details are not described herein again.

In other words, in this embodiment, the space-based platform is a flight device such as an unmanned aerial vehicle, a balloon, a glider, an airship, or a helicopter, and may move between the first area and the second area, to send the first information to the communications device, and send the second information to the MTC device.

Figure 6:
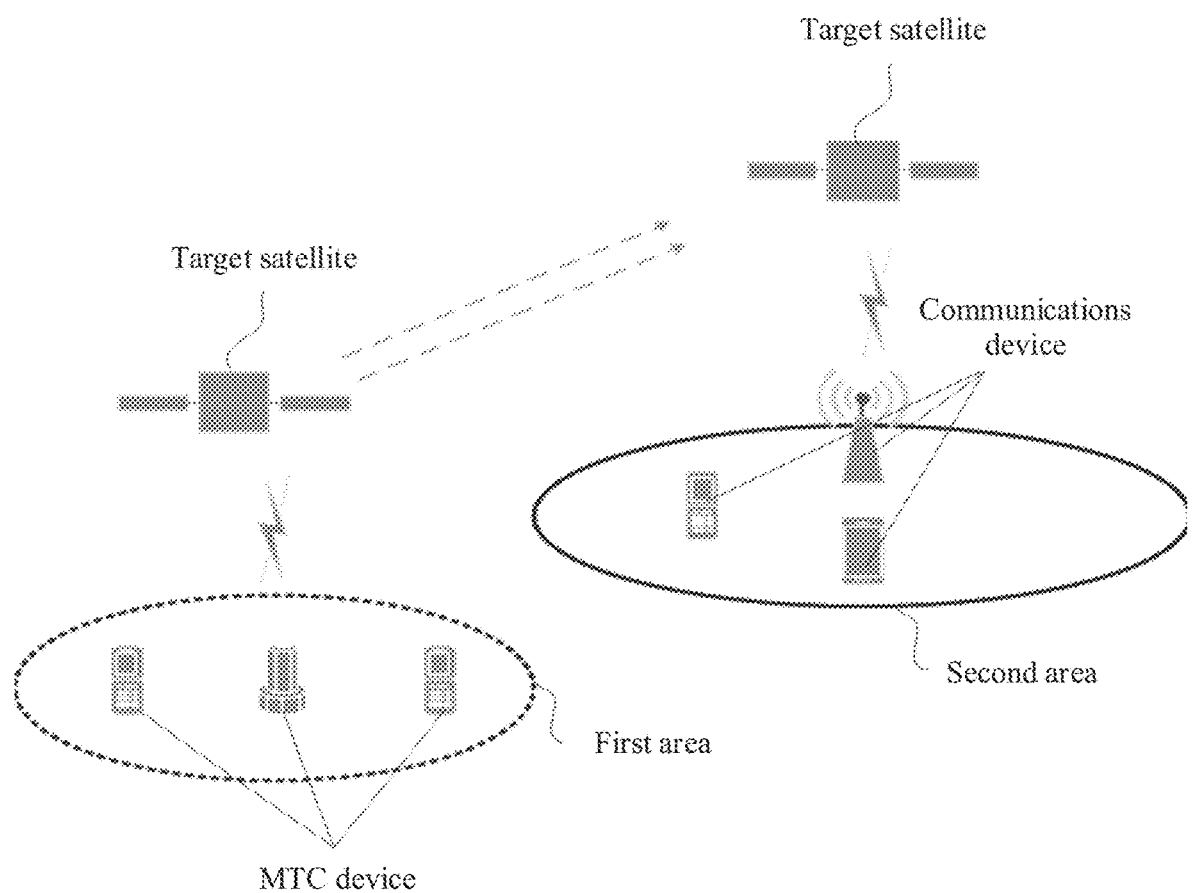
FIG. 6 is a schematic diagram of another scenario according to an embodiment of this application.
Figure 7:
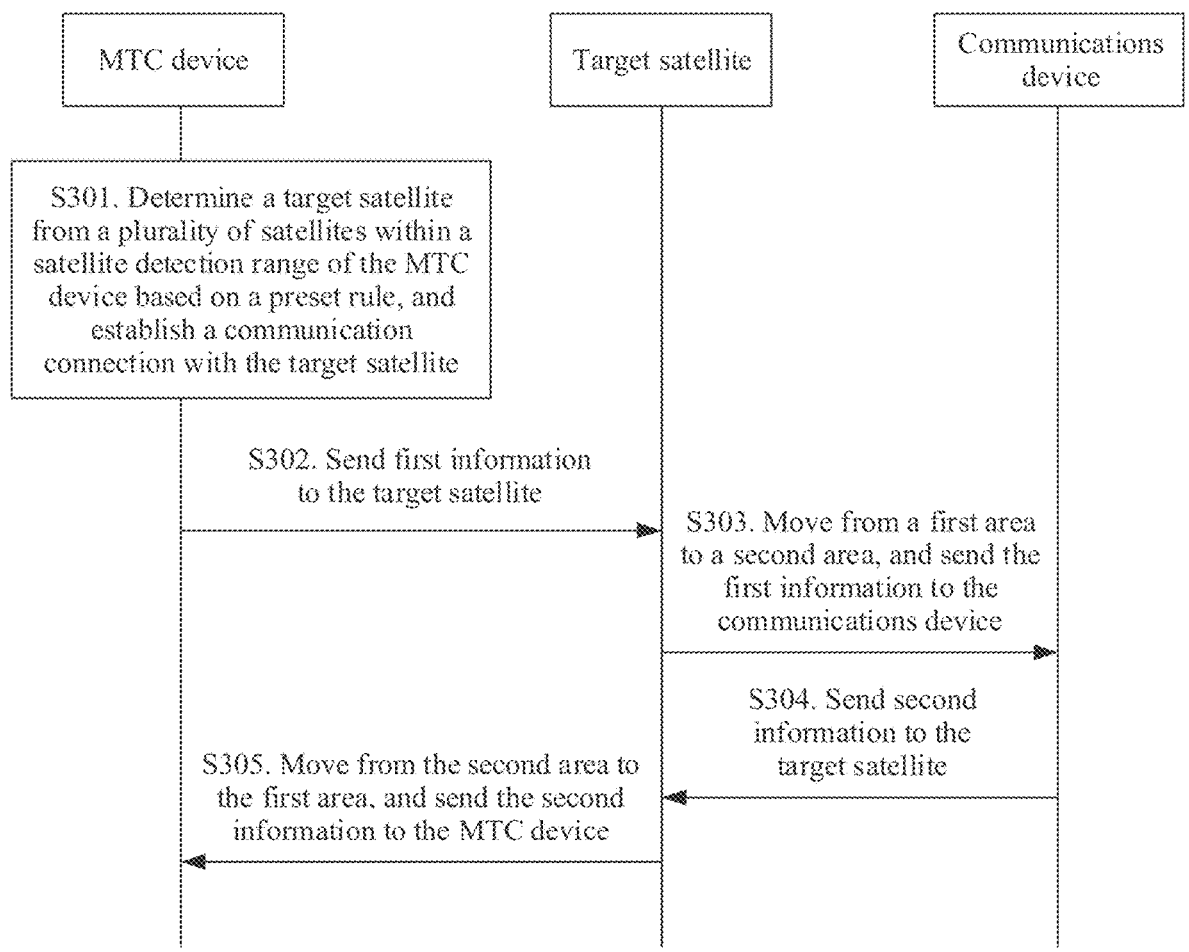
FIG. 7 is another example flowchart of a communication method according to an embodiment of this application.

Example 2: As shown in FIG. 6, the space-based platform shown in FIG. 6 is a satellite, and as shown in FIG. 7, a communication process in this embodiment may include the following steps.

S301. An MTC device determines a target satellite from a plurality of satellites within a satellite detection range of the MTC device based on a preset rule, and establishes a communication connection with the target satellite.

Specifically, the MTC device may detect a satellite passing through a top area of the MTC device, and record this area as a satellite detection range of the MTC device. In actual application, the MTC device detects ephemeris information of a plurality of satellites within a satellite detection range of the MTC device based on a preset rule, and determines one target satellite from the plurality of satellites based on the ephemeris information. The target satellite is a satellite that meets the preset rule. For example, the preset rule is a time interval at which the MTC device sends the first information, and the MTC device may determine, based on ephemeris information of the target satellite, that the target satellite moves between a first area and a second area, and a time interval at which the target satellite arrives at the first area is consistent with the time interval at which the MTC device sends the first information, Then, the MTC device establishes the communication connection with the target satellite.

S302. The MTC device sends the first information to the target satellite.

S303. The target satellite moves from the first area to the second area, and sends the first information to a communications device.

S304. The communications device sends second information to the target satellite.

S305. The target satellite moves from the second area to the first area, and sends the second information to the MTC device.

For an execution process of S301 to S305, refer to specific descriptions of S101 to S105. Details are not described herein again.

In other words, in this embodiment, the space-based platform is a satellite, the satellite may be a satellite in current space, and the satellite moves between the first area and the second area, to send the first information to the communications device, and send the second information to the MTC device.

Figure 8:
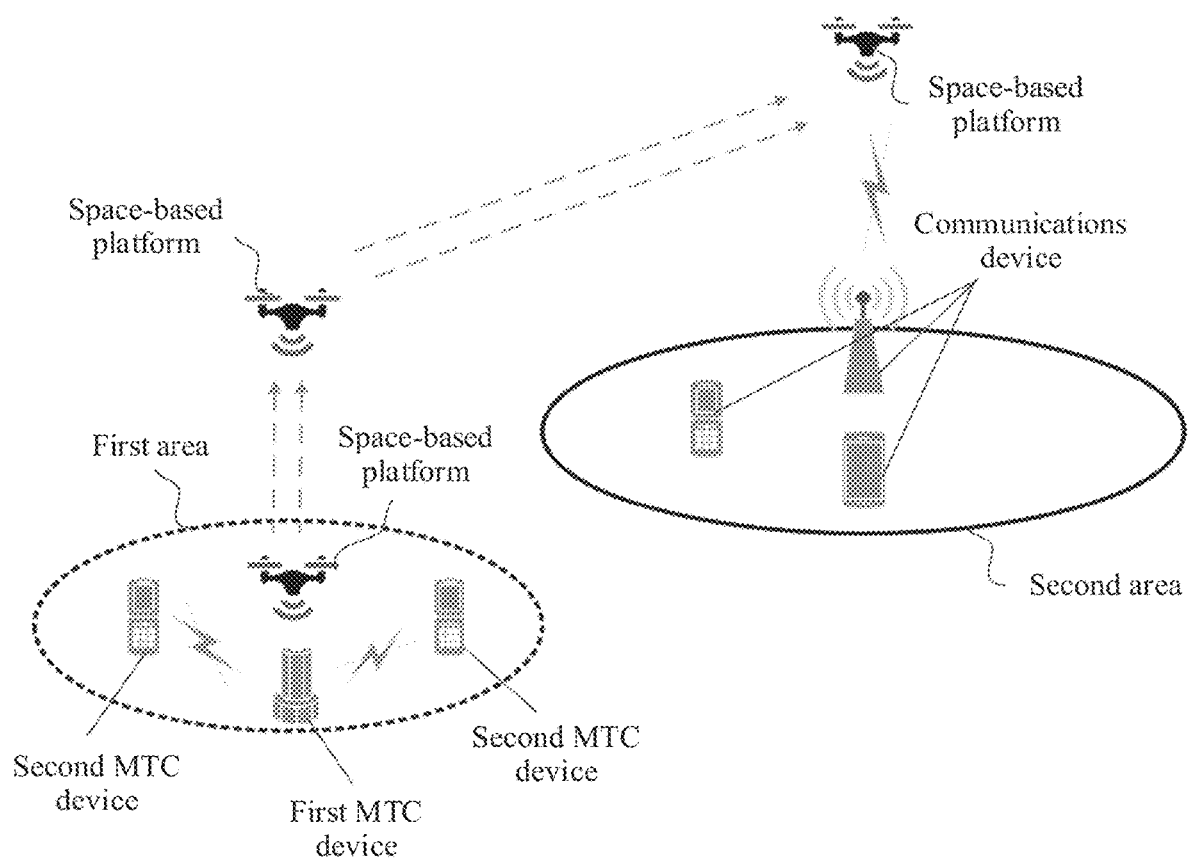
FIG. 8 is a schematic diagram of another scenario according to an embodiment of this application.
Figure 10:
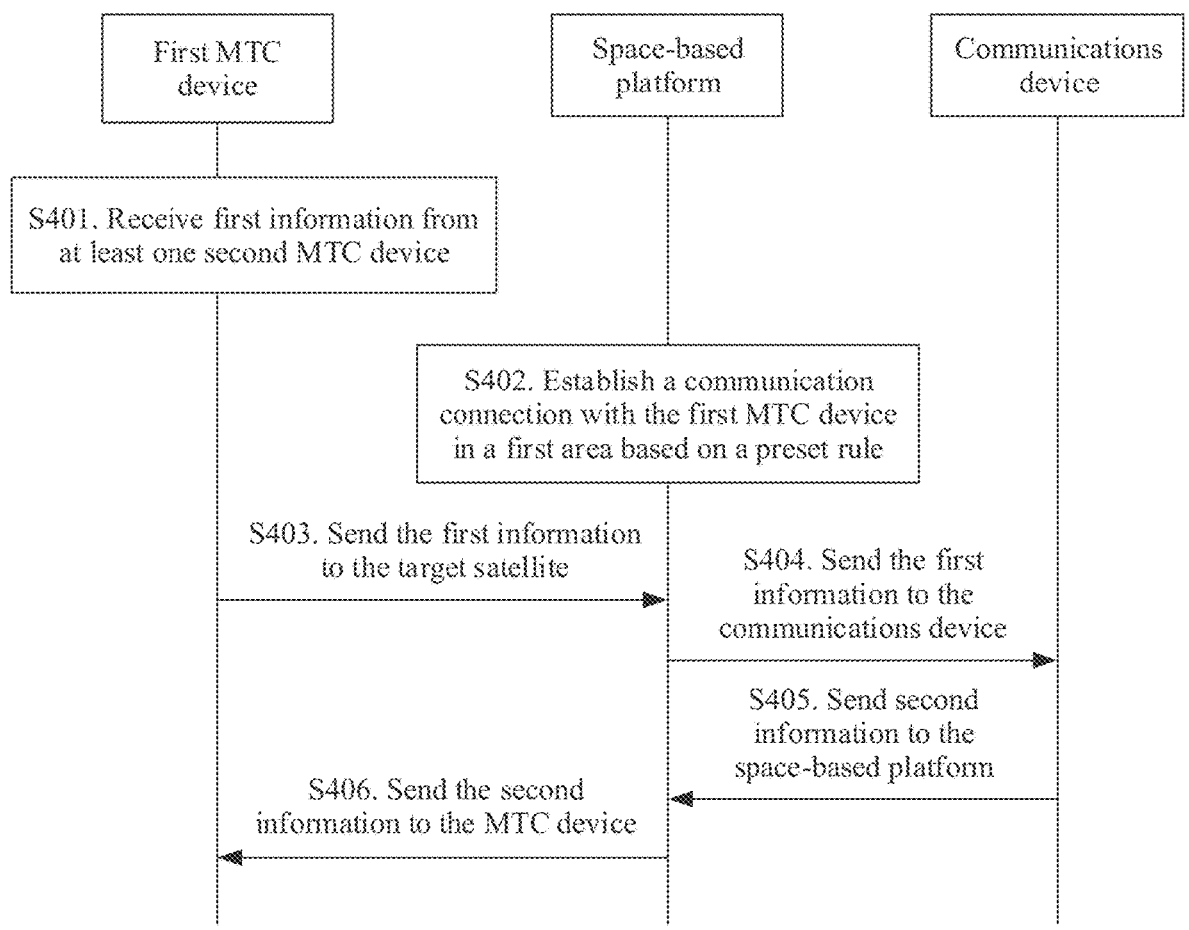
FIG. 10 is another example flowchart of a communication method according to an embodiment of this application.

Example 3: As shown in FIG. 8, the space-based platform shown in FIG. 8 is an unmanned aerial vehicle. Optionally, the space-based platform may alternatively be a flight device such as a balloon, a glider, an airship, or a helicopter. The first information sent by the MTC device in this embodiment includes information about at least one other MTC device. To help the area to mark the MTC device that establishes a communication connection with the space-based platform as a first MTC device, other MTC devices except the first MTC device in the first area are marked as second MTC devices. As shown in FIG. 10, a communication process in this embodiment is as follows.

S401. The first MTC device receives first information from at least one second MTC device.

In other words, in this embodiment of this application, the first information sent by the first MTC device not only includes information that needs to be sent to the communications device by the first MTC device, but also includes information that needs to be sent to the communications device by the at least one second MTC device.

S402. The space-based platform establishes a communication connection with the first MTC device in the first area based on a preset rule.

It should be noted that there is no sequence relationship between S401 and S402.

S403. The MTC device sends the first information to the space-based platform.

S404. The space-based platform sends the first information to the communications device.

S405. The communications device sends second information to the space-based platform.

S406. The space-based platform sends the second information to the MTC device.

In an implementation, S404 may be shown in FIG. 4. To be specific, the space-based platform moves from the first area to the second area, and sends the first information to the communications device. Correspondingly, S405 may be: The communications device sends second information to the space-based platform, and the space-based platform moves from the second area to the first area, and sends the second information to the first MTC device.

After receiving the second information, the first MTC device parses the second information, and if it is determined that the second information is information to be sent to the second MTC device, the first MTC device sends the second information to the corresponding second MTC device, to implement distribution of the second information.

Figure 9:
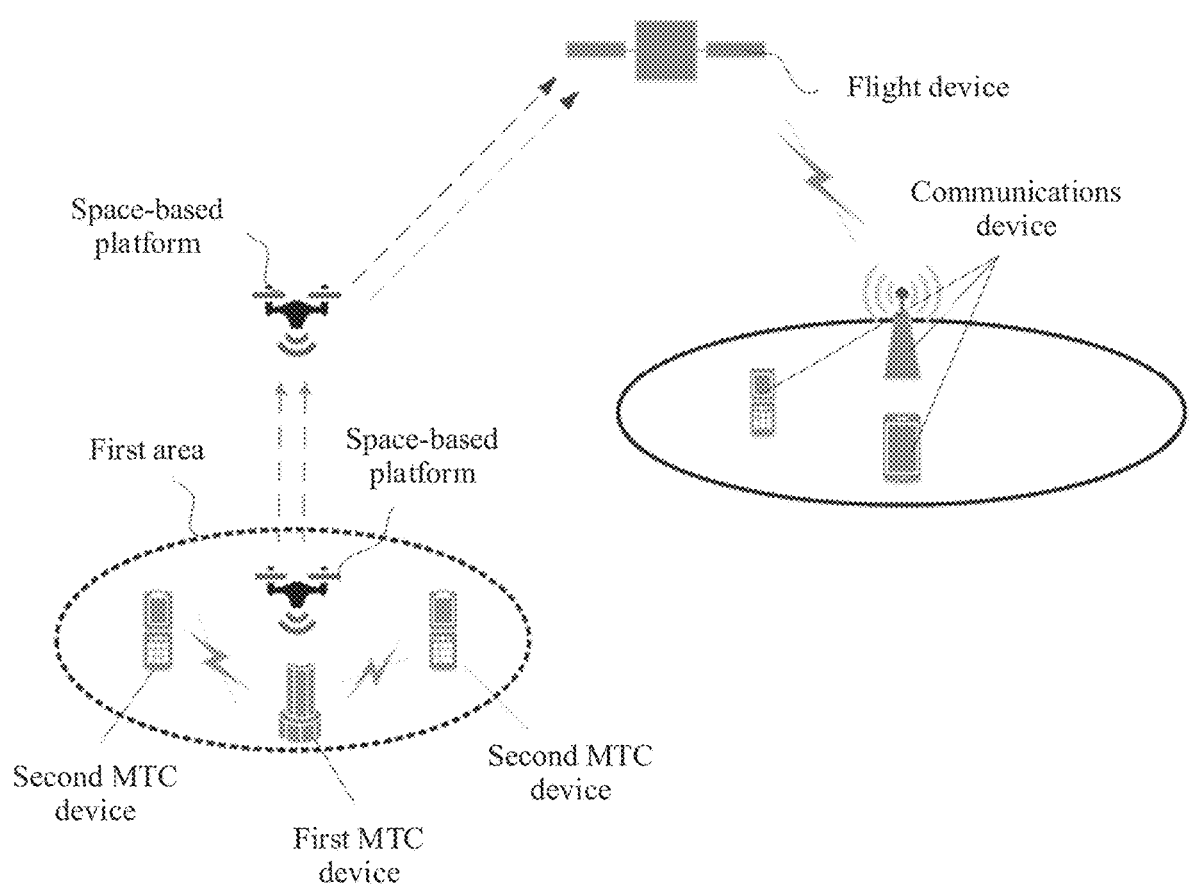
FIG. 9 is a schematic diagram of another scenario according to an embodiment of this application.

In another implementation, S404 may be shown in FIG. 9. After receiving the first information, the space-based platform forwards the first information to another flight device, for example, forwards the first information to another unmanned aerial vehicle, balloon, glider, airship, helicopter, satellite, or the like. Correspondingly, S405 may be: The communications device sends second information to the another flight device, and the flight device sends the second information to the space-based platform. The space-based platform then sends the second information to the first MTC device, so that the first MTC device distributes the second information to the corresponding second MTC device.

For an execution process of S401 to S406, refer to specific descriptions of S101 to S105. Details are not described herein again.

In other words, in this embodiment, the first MTC device collects the first information of the second MTC device, and sends the first information to the space-based platform, so that the space-based platform only establishes a communication connection with the first MTC device, and does not need to establish a communication connection with the second MTC device, thereby reducing the quantity of communication connections between the space-based platform and the MTC device, and further improving efficiency of the communication connection between the space-based platform and the MTC device.

Figure 11:
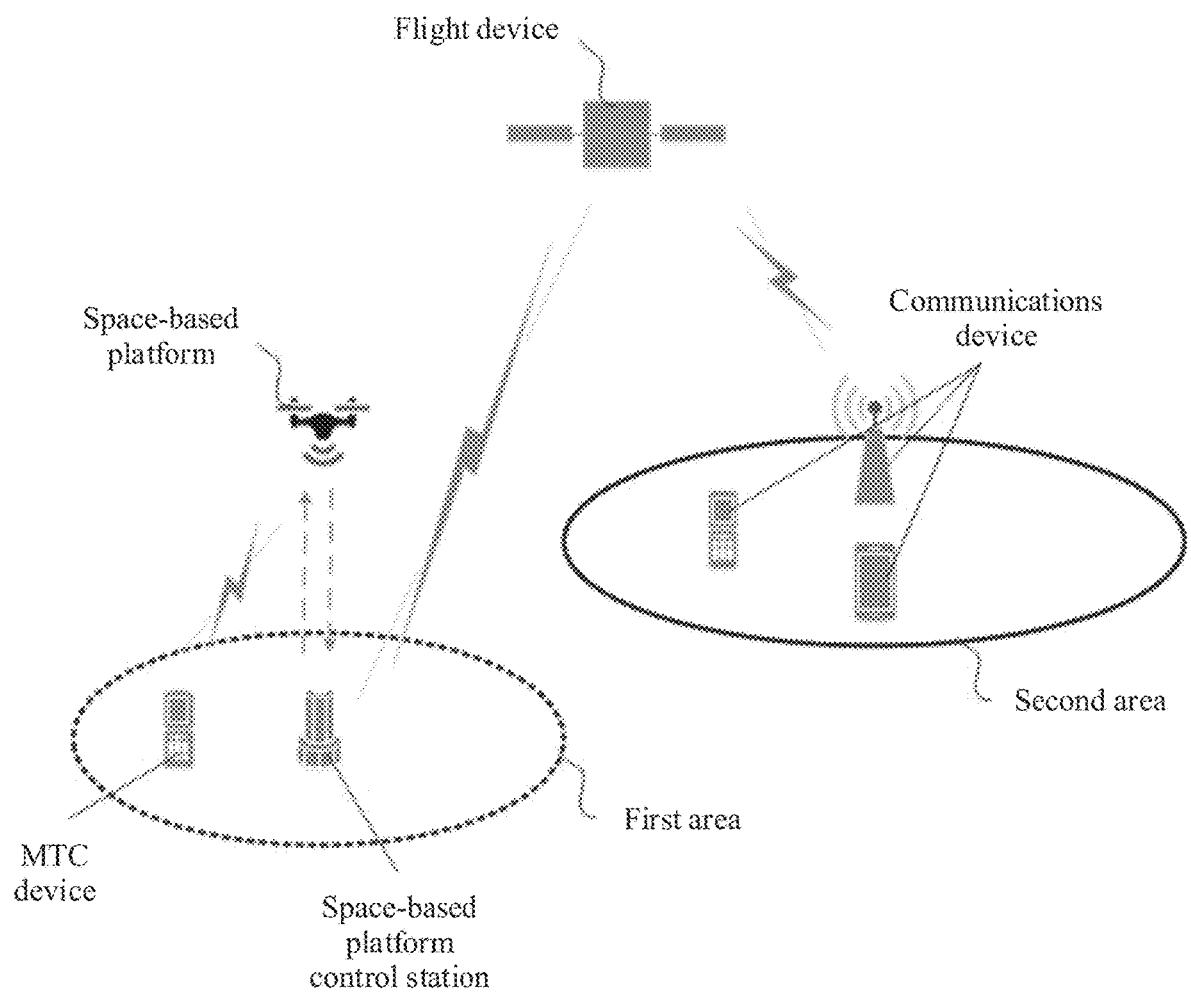
FIG. 11 is a schematic diagram of another scenario according to an embodiment of this application.
Figure 13:
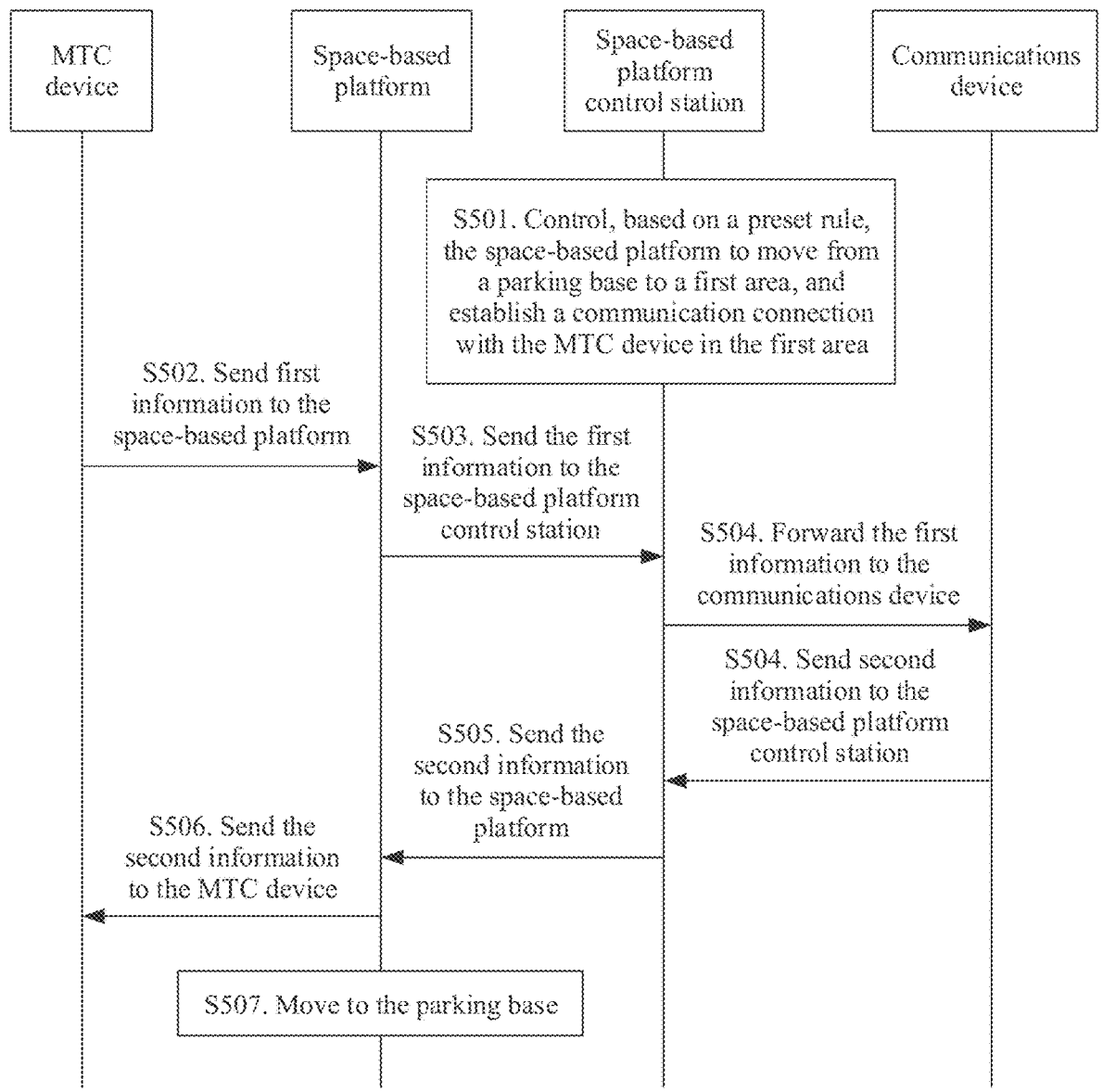
FIG. 13 is another example flowchart of a communication method according to an embodiment of this application.

Example 4: As shown in FIG. 11, the space-based platform shown in FIG. 11 is an unmanned aerial vehicle. Optionally, the space-based platform may alternatively be a flight device such as a balloon, a glider, an airship, or a helicopter. The space-based platform moves under control of a space-based platform control station. As shown in FIG. 13, a communication process in this embodiment may include the following steps.

S501. The space-based platform control station controls, based on a preset rule, a space-based platform to move from a parking base to a first area, and establishes a communication connection with an MTC device in the first area.

S502. The MTC device sends first information to the space-based platform.

S503. The space-based platform sends the first information to the space-based platform control station.

S504. The space-based platform control station forwards the first information to a communications device.

S504. The communications device sends second information to the space-based platform control station.

S505. The space-based platform control station sends the second information to the space-based platform.

S506. The space-based platform sends the second information to the MTC device.

S507. The space-based platform moves to the parking base.

In an example, as shown in FIG. 11 if the space-based platform control station is an immovable apparatus such as a relay station, a ground station, or a communications device, the space-based platform control station shown in FIG. 11 is located in the first area. Optionally, the space-based platform control station may alternatively be located in a second area or an area outside the first area and the second area. A specific location of the space-based platform control station is not limited in this embodiment of this application, and is specifically determined based on an actual requirement.

In this example, after receiving the first information, the space-based platform sends the first information to the space-based platform control station, and after receiving the first information, the space-based platform control station forwards the first information to the communications device by using another flight device. The another flight device may be a flight device such as an unmanned aerial vehicle, a balloon, a glider, an airship, a helicopter, or a satellite. Similarly, the another flight device receives the second information from the communications device and sends the second information to the space-based platform control station. The space-based platform control station then sends the second information to the space-based platform, so that the space-based platform sends the second information to the MTC device.

Optionally, if the flight device is a satellite, the space-based platform control station determines, based on a prestored ephemeris, a satellite that moves between the first area and the second area. Then, when the satellite arrives at the first area, the buffered first information is sent to the satellite, so that the satellite sends the first information to the communications device in the second area.

Optionally, the space-based platform control station may be disposed on land, or may be disposed on water, for example, disposed on a water platform, a ship, or a buoy.

Figure 12:
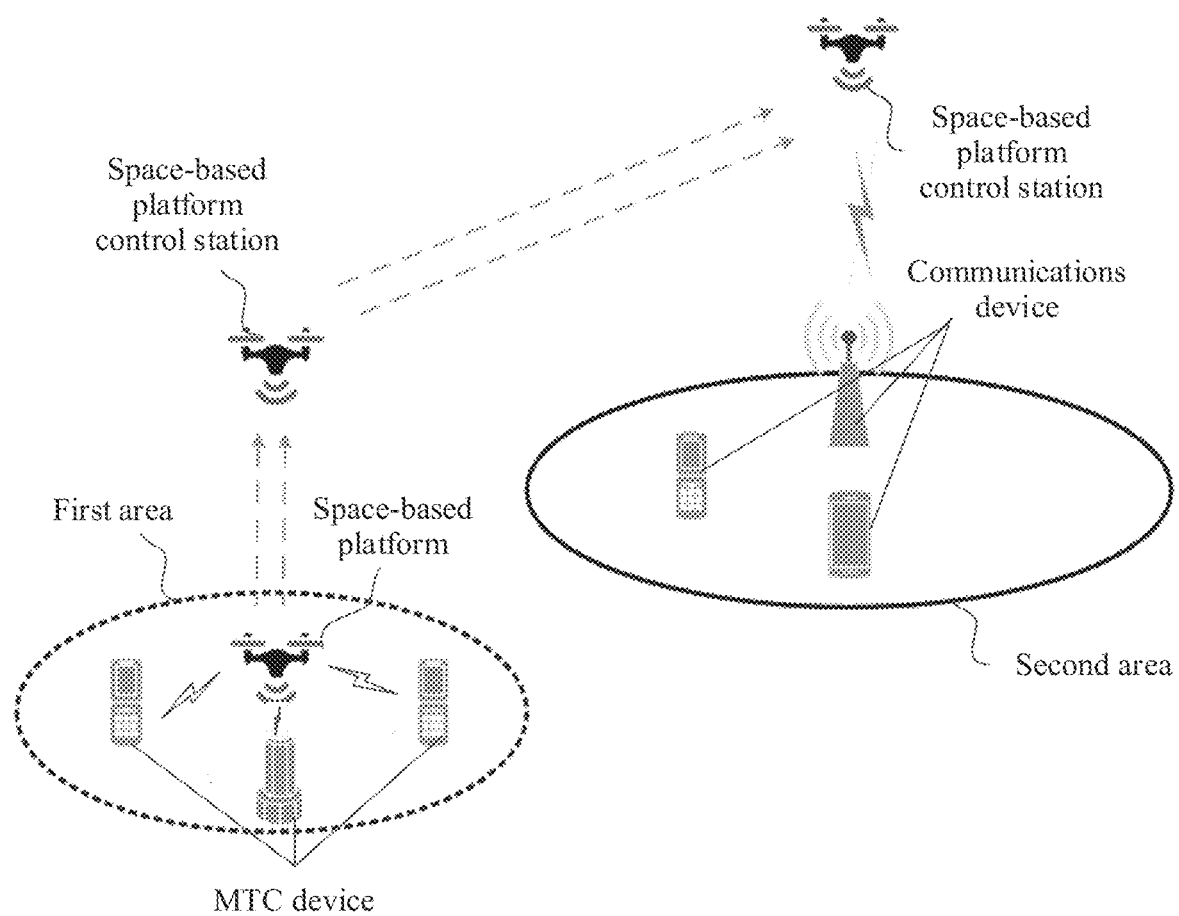
FIG. 12 is a schematic diagram of another scenario according to an embodiment of this application.

In another example, the space-based platform control station is a movable flight device. In this case, as shown in FIG. 12, after receiving the first information from the space-based platform, the space-based platform control station moves from the first area to the second area, and sends the first information to the communications device. Further, after receiving the second information from the communications device, the space-based platform control station moves from the second area to the first area, and sends the second information to the space-based platform, so that the space-based platform sends the second information to the MTC device.

In this embodiment, the space-based platform control station is used to control movement of the space-based platform. Optionally, the space-based platform may serve as a relay, and function as a bridge between the space-based platform and the communications device, thereby enriching communication manners between the first area and the second area.

Figure 14:
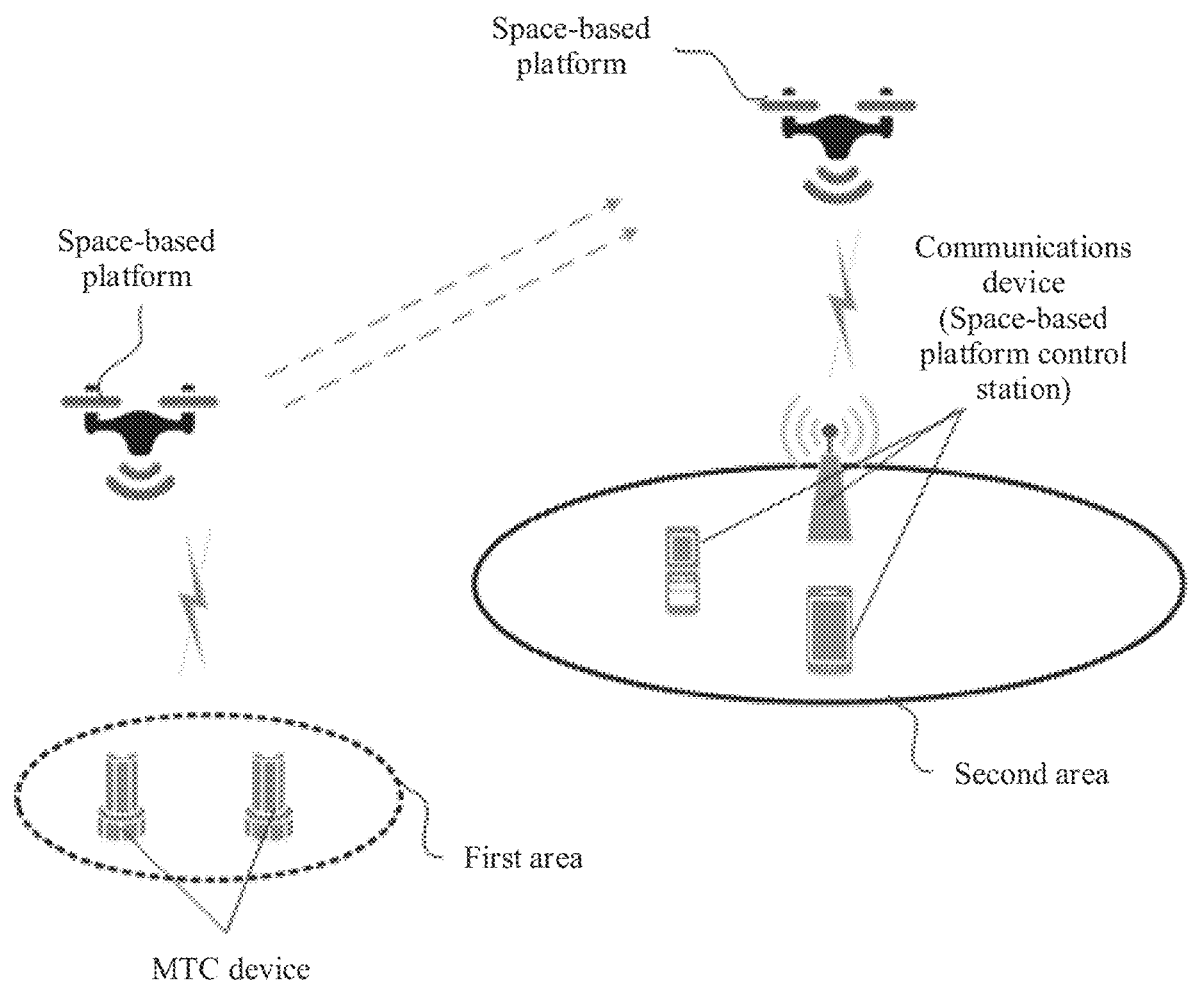
FIG. 14 is a schematic diagram of another scenario according to an embodiment of this application.
Figure 15:
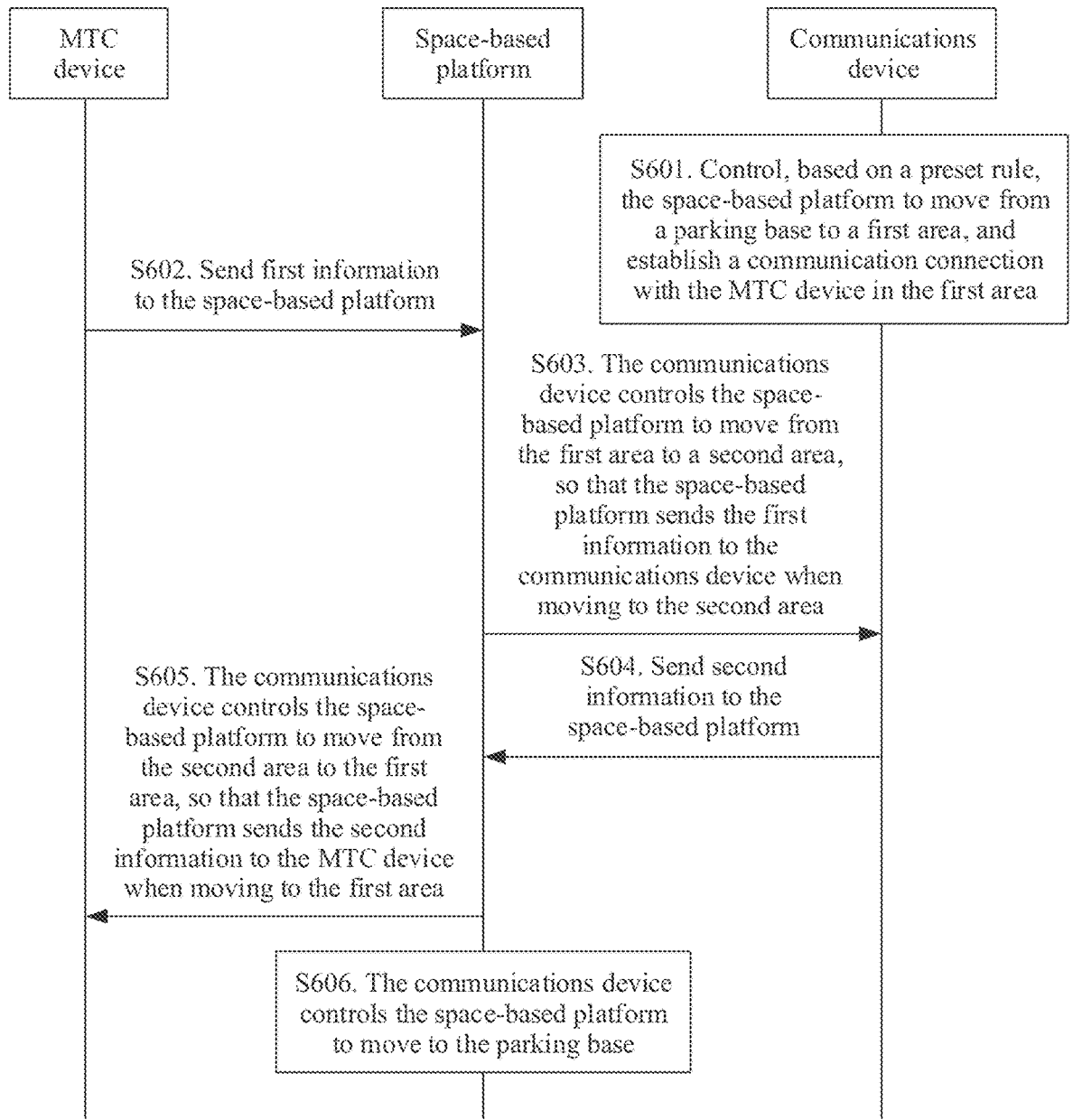
FIG. 15 is another example flowchart of a communication method according to an embodiment of this application.

Example 5: As shown in FIG. 14, the space-based platform shown in FIG. 14 is an unmanned aerial vehicle. Optionally, the space-based platform may alternatively be a flight device such as a balloon, a glider, an airship, or a helicopter. The space-based platform control station is a communications device in a second area. As shown in FIG. 15, a communication process in this embodiment may include the following steps.

S601. The communications device control station controls, based on a preset rule, a space-based platform to move from a parking base to a first area, and establishes a communication connection with an MTC device in the first area.

S602. The MTC device sends first information to the space-based platform.

S603. The communications device controls the space-based platform to move from the first area to the second area, so that the space-based platform sends the first information to the communications device when moving to the second area.

S604. The communications device sends second information to the space-based platform.

S605. The communications device controls the space-based platform to move from the second area to the first area, so that the space-based platform sends the second information to the MTC device when moving to the first area.

S606. The communications device controls the space-based platform to move to the parking base.

For an execution process of S601 to S606, refer to specific descriptions of S101 to S105. Details are not described herein again.

In this embodiment, the communications device is used as a space-based platform control station, and the communications device controls the space-based platform to move between the first area and the second area.

Figure 16:
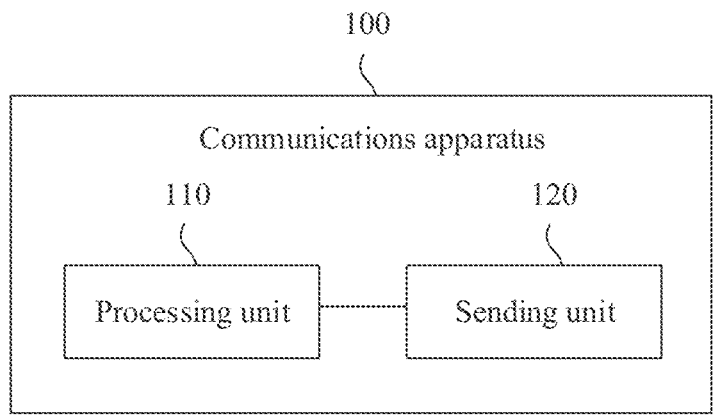
FIG. 16 is a schematic structural diagram of a communications apparatus according to an embodiment of this application.

FIG. 16 is a schematic structural diagram of a communications apparatus according to an embodiment of this application. The communications apparatus may be an MTC device, or may be a component (for example, an integrated circuit or a chip) of an MTC device. As shown in FIG. 16, the communications apparatus 100 may include a processing unit 110 and a sending unit 120.

The processing unit 110 is configured to establish a communication connection with a space-based platform based on a preset time rule, where the MTC device is located in a first area.

The sending unit 120 is configured to send first information to the space-based platform, so that the space-based platform sends the first information to a communications device located in a second area.

The apparatus in this embodiment may be used to execute the technical solutions of the MTC device in the foregoing method embodiments. The implementation principles and technical effects are similar, and are not further described herein.

Figure 17:
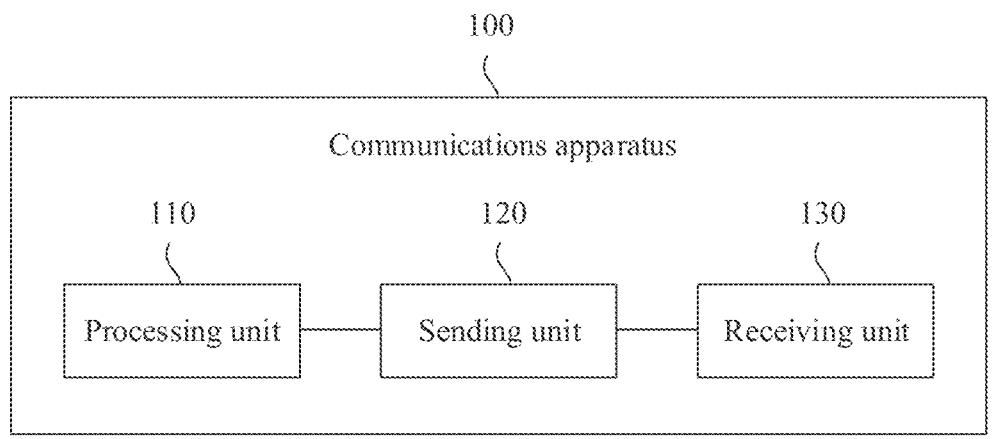
FIG. 17 is a schematic structural diagram of another communications apparatus according to an embodiment of this application.

FIG. 17 is a schematic structural diagram of another communications apparatus according to an embodiment of this application. Based on the foregoing embodiment, as shown in FIG. 17, the communications apparatus 100 may further include a receiving unit 130.

The receiving unit 130 is configured to receive second information from the space-based platform, where the second information is received by the space-based platform from the communications device.

In an implementation, at least a part of the first area is located outside network coverage of the second area.

In another implementation, the space-based platform moves between the first area and the second area.

In another implementation, the first information includes information received by the MTC device from at least one other MTC device.

In another implementation, the preset time rule includes either of a preset time periodicity and a time interval at which the MTC device sends the first information.

The apparatus in this embodiment may be used to execute the technical solutions of the MTC device in the foregoing method embodiments. The implementation principles and technical effects are similar, and are not further described herein.

Figure 18:
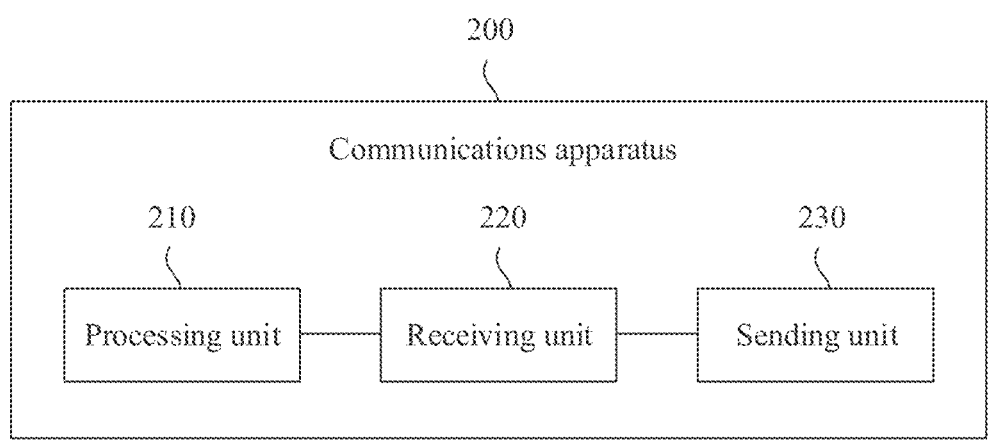
FIG. 18 is a schematic structural diagram of a communications apparatus according to an embodiment of this application.

FIG. 18 is a schematic structural diagram of a communications apparatus according to an embodiment of this application. The communications apparatus may be a space-based platform, or may be a component (for example, an integrated circuit or a chip) of a space-based platform. As shown in FIG. 18, the communications apparatus 200 may include a processing unit 210, a receiving unit 220, and a sending unit 230.

The processing unit 210 is configured to establish a communication connection with an MTC device based on a preset time rule, where the MTC device is located in a first area.

The receiving unit 220 is configured to receive first information from the MTC device.

The sending unit 230 is configured to send the first information to a communications device, where the communications device is located in a second area.

The apparatus in this embodiment of this application may be used to execute the technical solutions of the MTC device in the foregoing method embodiments. The implementation principles and technical effects are similar, and are not further described herein.

In an implementation, the receiving unit 220 is further configured to receive second information from the communications device.

The sending unit 230 is further configured to send the second information to the MTC device.

In another implementation, at least a part of the first area is located outside network coverage of the second area.

In another implementation, the space-based platform moves between the first area and the second area.

Optionally, the space-based platform is any one of an unmanned aerial vehicle, a balloon, a glider, an airship, a helicopter, and a satellite.

The apparatus in this embodiment of this application may be used to execute the technical solutions of the space-based platform in the foregoing method embodiments. The implementation principles and technical effects are similar, and are not further described herein.

Figure 19:
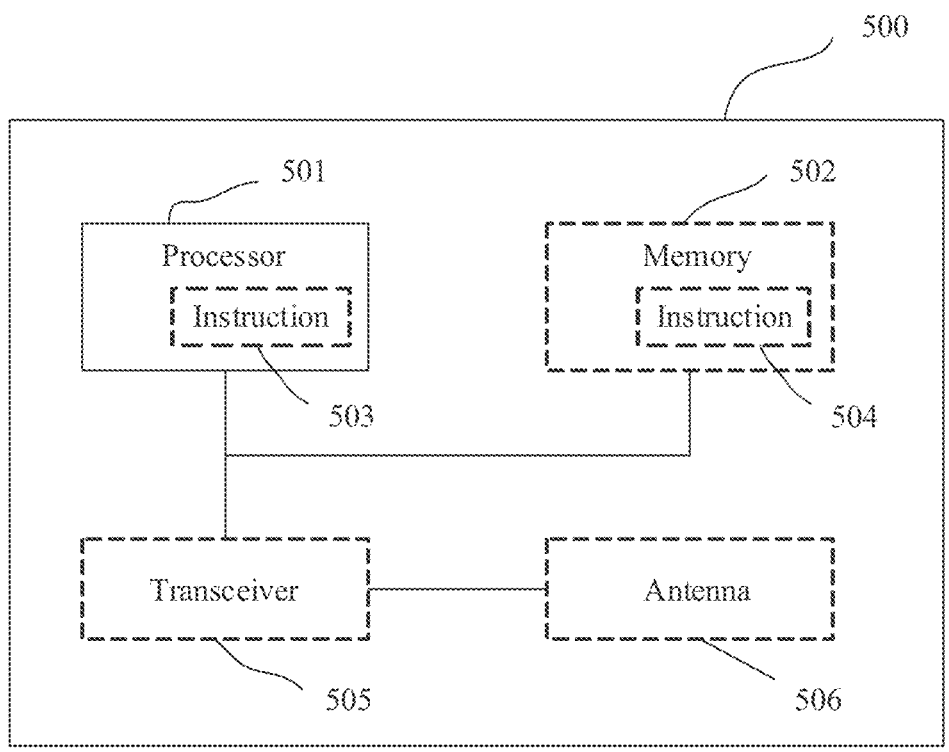
FIG. 19 is a schematic structural diagram of a communications device according to an embodiment of this application.

FIG. 19 is a schematic structural diagram of a communications device according to an embodiment of this application. As shown in FIG. 19, the communications device 500 in this embodiment may be an MTC device (or a component that may be used for an MTC device) or a space-based platform (or a component that may be used for a space-based platform) mentioned in the foregoing method embodiments. The communications device may be configured to implement the method corresponding to the MTC device or the space-based platform described in the foregoing method embodiments. For details, refer to the descriptions in the foregoing method embodiments.

The communications device 500 may include one or more processors 501. The processor 501 may also be referred to as a processing unit, and can implement a specific control or processing function. The processor 501 may be a general-purpose processor, a dedicated processor, or the like. For example, the processor 501 may be a baseband processor or a central processing unit. The baseband processor may be configured to process a communications protocol and communication data, and the central processing unit may be configured to control the communications device, execute a software program, and process data of the software program.

In a possible design, the processor 501 may alternatively store an instruction 503 or data (for example, intermediate data). The instruction 503 may be run by the processor, so that the communications device 500 performs the method corresponding to the MTC device or the space-based platform described in the foregoing method embodiments.

In another possible design, the communications device 500 may include a circuit, and the circuit can implement a sending, receiving, or communication function n the foregoing method embodiments.

Optionally, the communications device 500 may include one or more memories 502, and the memory 502 may store an instruction 504. The instruction may be run on the processor, so that the communications device 500 performs the method described in the foregoing method embodiments.

Optionally, the processor and the memory may be independently disposed, or may be integrated together. When the communications device is a chip, the memory may alternatively be located outside the communications device.

Optionally, the communications device 500 may further include a transceiver 505 and/or an antenna 506. The processor 501 may be referred to as a processing unit, and controls a communications device (for example, an MTC device or a space-based platform). The transceiver 505 may be referred to as a transceiver unit, a transceiver, a transceiver circuit, or the like, and is configured to implement a transceiver function of the communications device.

In a design, if the communications device 500 is configured to implement an operation corresponding to the MTC device in the foregoing embodiments, for example, the processor 501 may establish a communication connection with a space-based platform based on a preset time rule, and after the communication connection is established, the transceiver 505 sends first information to the space-based platform, so that the space-based platform sends the first information to a communications device located in a second area.

For specific implementation processes of the transceiver 505 and the processor 501, refer to related descriptions of the MTC device in the foregoing embodiments. Details are not described herein again.

In another design, if the communications device 500 is configured to implement an operation corresponding to the space-based platform in the foregoing embodiments, for example, the processor 501 may establish a communication connection with the MTC device based on a preset time rule, where the MTC device is located in a first area, and after the communication connection is established, the transceiver 505 receives first information from the MTC device, and sends the first information to a communications device, where the communications device is located in a second area.

For specific implementation processes of the transceiver 505 and the processor 501, refer to related descriptions of the space-based platform in the foregoing embodiments. Details are not described herein again.

The processor 501 and the transceiver 505 described in this application may be implemented in an integrated circuit (IC), an analog IC, a radio frequency integrated circuit (RFIC), a hybrid signal IC, an application specific integrated circuit (ASIC), a printed circuit board (PCB), an electronic device, and the like. The processor and the transceiver may also be manufactured using various IC process technologies, such as a complementary metal oxide semiconductor (CMOS), an N-channel metal oxide semiconductor (NMOS), a P-channel metal oxide semiconductor (PMOS), and a bipolar junction transistor (BJT), a bipolar CMOS (BiCMOS), silicon-germanium (SiGe), gallium arsenide (GaAs), and the like.

Although the communications device 500 is described by using an MTC device or a space-based platform as an example in the foregoing embodiments, a range of the communications device described in this application is not limited to the MTC device or the space-based platform, and a structure of the communications device may not be limited to FIG. 19.

The communications device in this embodiment of this application may be used to execute the technical solutions of the MTC device or space-based platform in the foregoing method embodiments. The implementation principles and technical effects are similar, and are not further described herein.

Figure 20:
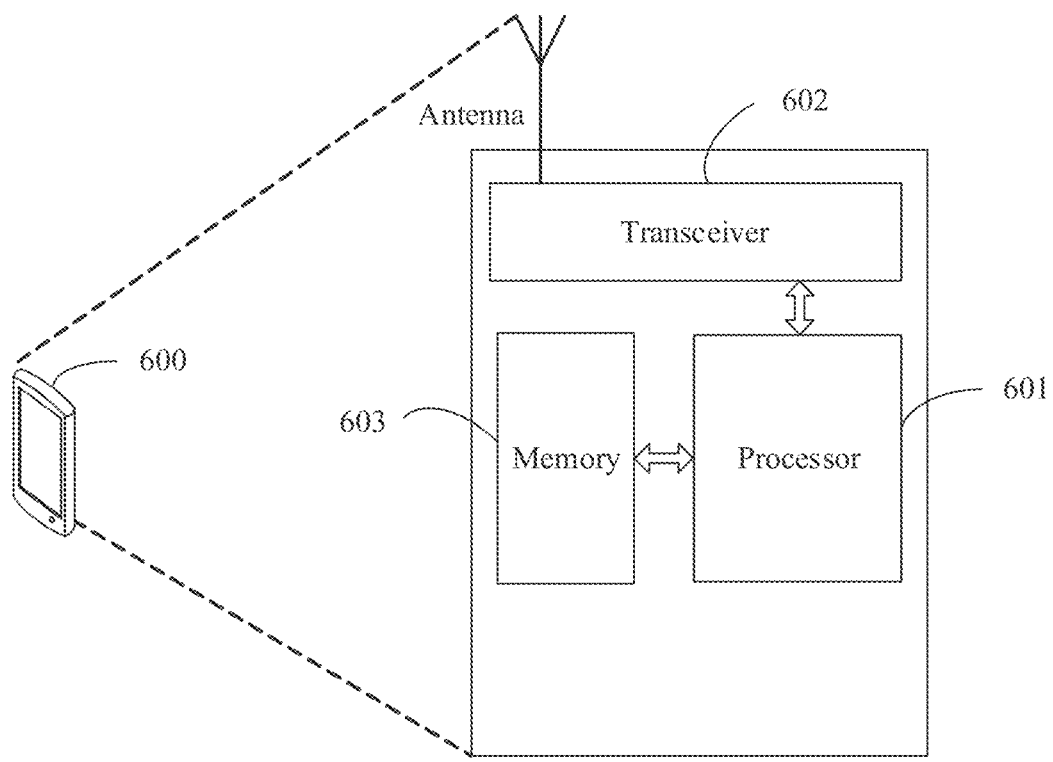
FIG. 20 is a schematic structural diagram of an MTC device according to an embodiment of this application.

FIG. 20 is a schematic structural diagram of an MTC device according to an embodiment of this application. The MTC device 600 can implement functions executed by the MTC device in the foregoing method embodiments, and the functions may be implemented by hardware, or may be implemented by hardware by executing corresponding software. The hardware or software includes one or more modules or units corresponding to the foregoing functions.

In a possible design, a structure of the MTC device 600 includes a processor 601, a transceiver 602, and a memory 603. The processor 601 is configured to support the MTC device 600 in performing corresponding functions in the foregoing method. The transceiver 602 is configured to support communication between the MTC device 600 and another MTC device or network device. The MTC device 600 may further include a memory 603. The memory 603 is configured to be coupled to the processor 601, and stores a program instruction and data that are necessary for the MTC device 600.

Optionally, the processor 601 and the memory 603 may be independently disposed, or may be integrated together. When the device 600 is a chip, the memory 603 may alternatively be located outside the device 600.

After the MTC device 600 is powered on, the processor 601 may read the program instruction and data in the memory 603, interpret and execute the program instruction, and process data of the program instruction. When data needs to be sent, the processor 601 performs baseband processing on the to-be-sent data and then outputs a baseband signal to the transceiver 602. The transceiver 602 performs radio frequency processing on the baseband signal, and then sends the radio frequency signal to the outside in a form of an electromagnetic wave by using an antenna. When data is sent to a terminal, the transceiver 602 receives the radio frequency signal by using the antenna, converts the radio frequency signal into a baseband signal, and outputs the baseband signal to the processor 601. The processor 601 converts the baseband signal into data and processes the data.

A person skilled in the art may understand that, for ease of description, FIG. 20 shows only one memory 603 and one processor 601. In an actual MTC device 600, there may be a plurality of processors and a plurality of memories. The memory 603 may also be referred to as a storage medium, a storage device, or the like. This is not limited in this embodiment of this application.

The network device in this embodiment may be used to execute the technical solutions of the foregoing method embodiment. The implementation principles and technical effects are similar, and are not further described herein.

Figure 21:
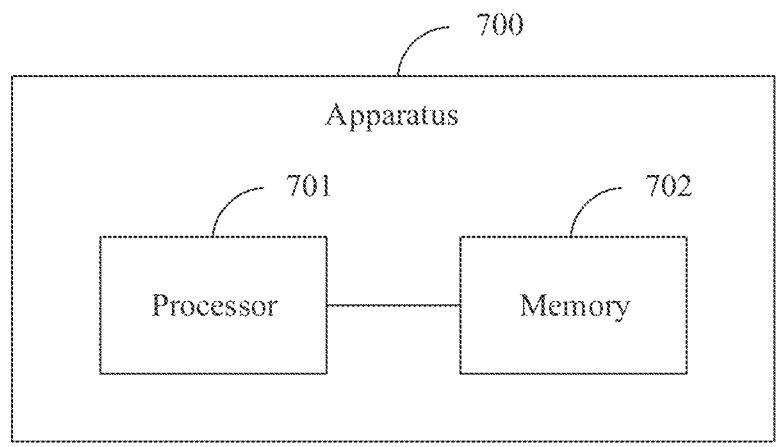
FIG. 21 is a schematic structural diagram of an apparatus according to an embodiment of this application.

FIG. 21 is a schematic structural diagram of an apparatus according to an embodiment of this application. The apparatus 700 exists in a product form of a chip. A structure of the apparatus includes a processor 701 and a memory 702. The memory 702 is configured to be coupled to the processor 701. The memory 702 stores a program instruction and data that are necessary for the apparatus. The processor 701 is configured to execute the program instruction stored in the memory 702, so that the apparatus performs functions of the MTC device in the foregoing method embodiments.

The apparatus in this embodiment of this application may be used to execute the technical solutions of terminal device in the foregoing method embodiments. The implementation principles and technical effects are similar, and are not further described herein.

Optionally, the processor 701 and the memory 702 may be independently disposed, or may be integrated together. When the apparatus 700 is a chip, the memory 702 may alternatively be located outside the apparatus 700.

Figure 22:
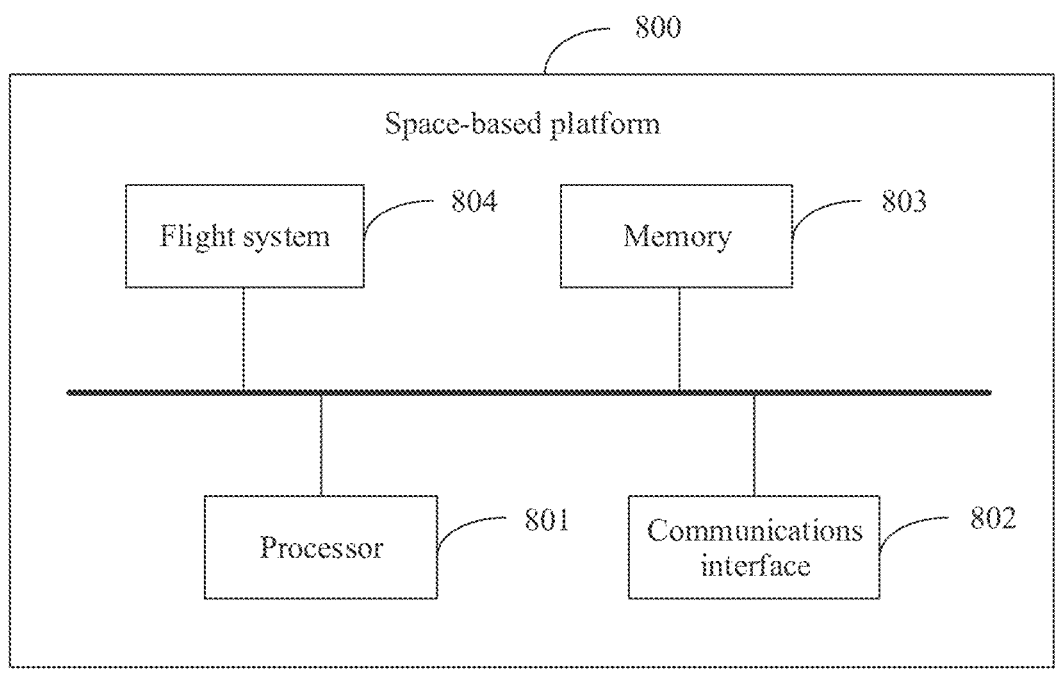
FIG. 22 is a schematic structural diagram of a space-based platform according to an embodiment of this application.

FIG. 22 is a schematic structural diagram of a space-based platform according to an embodiment of this application. The space-based platform 800 can implement functions executed by the space-based platform in the foregoing method embodiments, and the functions may be implemented by hardware, or may be implemented by hardware by executing corresponding software. The hardware or software includes one or more modules or units corresponding to the foregoing functions.

In a possible design, a structure of the space-based platform 800 includes a processor 801 and a communications interface 802. The processor 801 is configured to support the space-based platform 800 in performing corresponding functions in the foregoing method. The communications interface 802 is configured to support communication between the space-based platform 800 and another network element. The space-based platform 800 may further include a memory 803. The memory 803 is configured to be coupled to the processor 801, and stores a program instruction and data that are necessary for the space-based platform 800.

A person skilled in the art may understand that, for ease of description, FIG. 22 shows only one memory 803 and one processor 801. In an actual network device 800, there may be a plurality of processors and a plurality of memories. The memory 803 may also be referred to as a storage medium, a storage device, or the like. This is not limited in this embodiment of this application. The processor and the memory may be independently disposed, or may be integrated together.

The space-based platform 800 may further include a flight system 804. The flight system 804 is configured to control movement of the space-based platform 800 based on a flight instruction sent by the processor 801.

Figure 23:
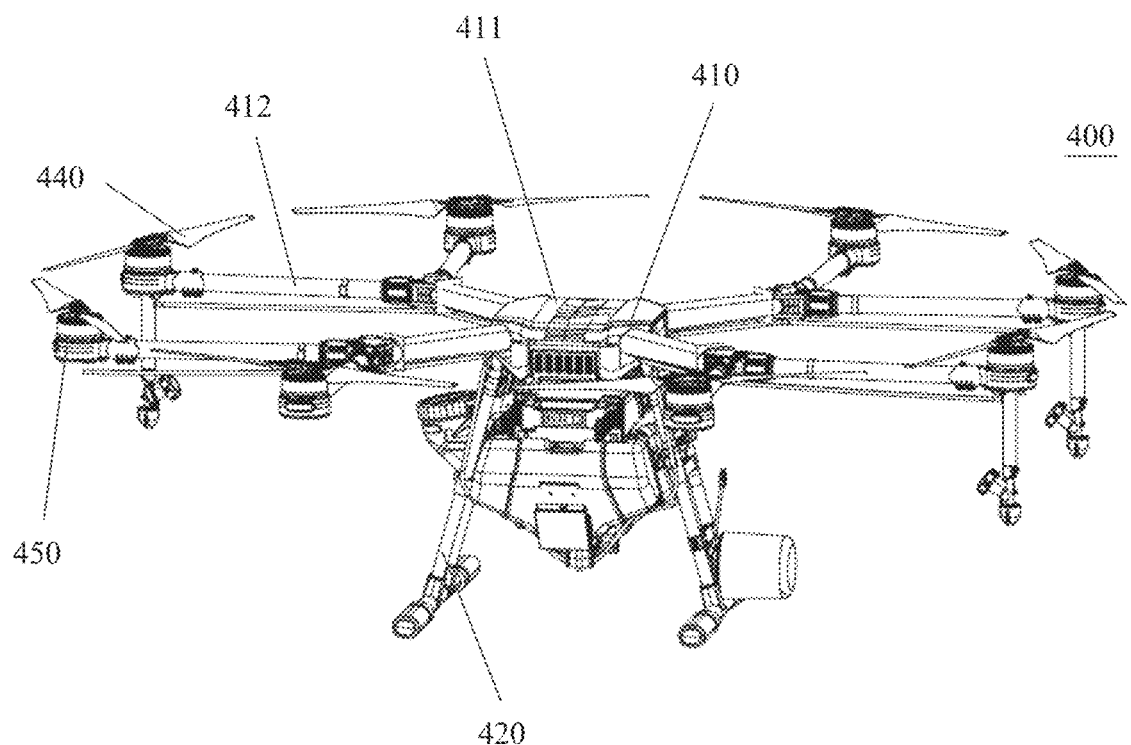
FIG. 23 is a schematic structural diagram of an unmanned aerial vehicle according to an embodiment of this application.

In an example, the space-based platform 800 is an unmanned aerial vehicle for example, a rotor-wing unmanned aerial vehicle. As shown in FIG. 23, the unmanned aerial vehicle 400 may include a power system, a flight control system, and a rack. The power system and the flight control system may be understood as the flight system 804. The unmanned aerial vehicle 400 may perform wireless communication with a control terminal. The control terminal may display flight information and the like of the unmanned aerial vehicle. The control terminal may communicate with the unmanned aerial vehicle 400 in a wireless manner, and is configured to remotely operate the unmanned aerial vehicle 400. Specifically, the control terminal communicates with the unmanned aerial vehicle 400 by using a communications interface of the unmanned aerial vehicle 400. Optionally, the control terminal may be a space-based platform control station.

The frame may include a fuselage 410 and a footstand 420 (also referred to as a landing gear). The fuselage 410 may include a central frame 411 and one or more arms 412 connected to the central frame 411, and the one or more arms 412 extend radially from the central frame. The footstand 420 is connected to the fuselage 410 for supporting the unmanned aerial vehicle 400 during landing.

The power system may include one or more electronic governors (governors for short), one or more propellers 440, and one or more motors 450 corresponding to the one or more propellers 440. The motor 450 is connected between the electronic governor and the propeller 440, and the motor 450 and the propeller 440 are disposed on the arm 412 of the unmanned aerial vehicle 400. The electronic governor is configured to receive a drive signal generated by the flight control system, and provide a drive current to the motor based on the drive signal, to control a rotational speed of the motor 450. The motor 450 is configured to drive the propeller 440 to rotate to provide power for flight of the unmanned aerial vehicle 400. The power enables the unmanned aerial vehicle 400 to implement movement of one or more degrees of freedom. In some embodiments, the unmanned aerial vehicle 400 may rotate about one or more rotational axes. For example, the rotation axis may include a roll shaft, a yaw shaft, and a pitch shaft. It should be understood that the motor 450 may be a direct current motor, or may be an alternating current motor. The motor 450 may be a brushless motor or a brushed motor.

The flight control system may include a flight controller and a sensing system. The sensing system is configured to measure attitude information of the unmanned aerial vehicle, namely, location information and status information of the unmanned aerial vehicle 400 in space, for example, a three-dimensional location, a three-dimensional angle, a three-dimensional velocity, a three-dimensional acceleration, and a three-dimensional angular velocity. The sensing system may include, for example, at least one of sensors such as a gyroscope, an ultrasonic sensor, an electronic compass, an inertial measurement unit (IMU), a vision sensor, a global navigation satellite system, and a barometer. For example, the global navigation satellite system may be a global positioning system (GPS). The flight controller is used to control flight of the unmanned aerial vehicle 400, for example, may control flight of the unmanned aerial vehicle 400 based on the attitude information measured by the sensing system. It should be understood that the flight controller may control the unmanned aerial vehicle 400 based on a pre-programmed instruction, or may control the unmanned aerial vehicle 400 in response to one or more control instructions from the control terminal.

It should be understood that the foregoing naming of the components of the unmanned aerial vehicle is merely for the purpose of identification, and should not be construed as a limitation on the embodiments of this application.

The terminal in this embodiment of this application may be used to execute the technical solutions of the space-based platform in the foregoing method embodiments. The implementation principles and technical effects are similar, and are not further described herein.

Figure 24:
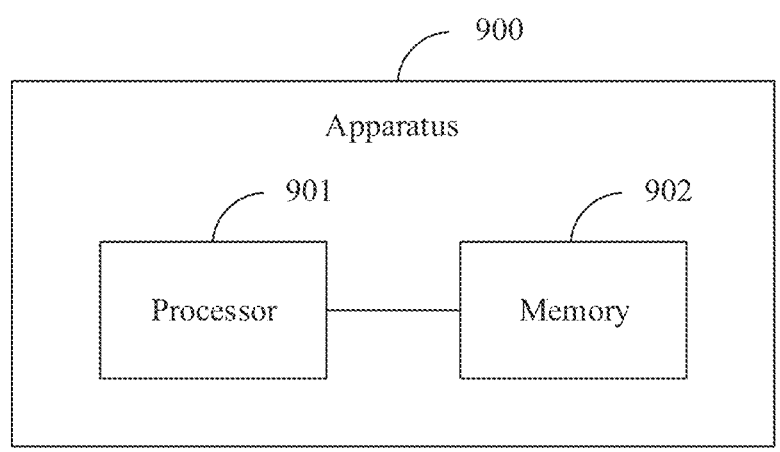
FIG. 24 is a schematic structural diagram of an apparatus according to an embodiment of this application.

FIG. 24 is a schematic structural diagram of an apparatus according to an embodiment of this application. The apparatus 900 exists in a product form of a chip. A structure of the apparatus includes a processor 901 and a memory 902. The memory 902 is configured to be coupled to the processor 901. The memory 902 stores a program instruction and data that are necessary for the apparatus. The processor 901 is configured to execute the program instruction stored in the memory 902, so that the apparatus performs functions of the space-based platform in the foregoing method embodiments.

The apparatus in this embodiment of this application may be used to execute the technical solutions of the space-based platform in the foregoing method embodiments. The implementation principles and technical effects are similar, and are not further described herein.

Optionally, the processor 901 and the memory 902 may be independently disposed, or may be integrated together. Further, the memory 902 may alternatively be outside the apparatus 900.

Figure 25:
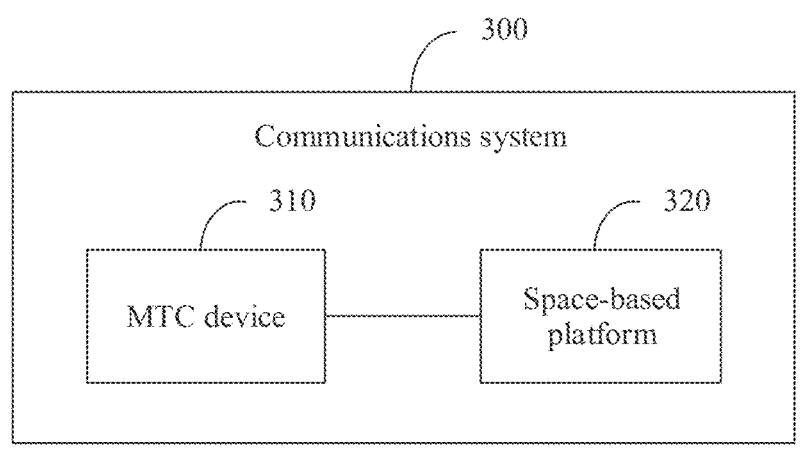
FIG. 25 is a schematic structural diagram of a communications system according to an embodiment of this application.

FIG. 25 is a schematic structural diagram of a communications system according to an embodiment of this application. As shown in FIG. 25, the communications system 300 in this embodiment of this application includes the foregoing MTC device 310 and space-based platform 320.

The MTC device 310 may be configured to implement functions of the MTC device in the foregoing method embodiments, and the space-based platform 320 may be configured to implement functions of a space-based platform side in the foregoing method embodiments. Implementation principles and technical effects thereof are similar, and details are not described herein again.

Based on such an understanding, the technical solutions of this application essentially, or the part contributing to the prior art, or all or some of the technical solutions may be implemented in the form of a software product. The computer software product is stored in a storage medium and includes instructions for instructing a computer device (which may be a personal computer, a server, or a network device) or a processor to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

All or some of the foregoing embodiments may be implemented by using software, hardware, firmware, or any combination thereof. When software is used to implement the embodiments, the embodiments may be implemented partially in a form of a computer program product. The computer program product includes one or more computer instructions. When the computer program instructions are loaded and executed on the computer, the procedure or functions according to some embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (1)SL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

It may be clearly understood by a person skilled in the art that, for the purpose of convenient and brief description, for a detailed working process of the foregoing system, apparatus, and unit, refer to a corresponding process in the foregoing method embodiments, and details are not described herein again. In addition, reference may also be made between method embodiments and apparatus embodiments, and same or corresponding content in different embodiments may be referenced by each other. Details are not described again.

What is claimed is:

1. A communication method, wherein the method comprises:
   establishing, by a machine type communications (MTC) device, a communication connection with a space-based platform based on a preset time rule, wherein the preset time rule comprises a time interval at which the MTC device sends first information, wherein the preset time rule is known to both the MTC device and the space-based platform before the MTC device establishes the communication connection with the space-based platform, and wherein the MTC device is located in a first area and supports a massive machine type communications (mMTC) service; and
   sending, by the MTC device, the first information to the space-based platform, wherein the space-based platform sends the first information to a communications device located in a second area.

2. The method according to claim 1, wherein the method further comprises:
   receiving, by the MTC device, second information from the space-based platform, wherein the second information is received by the space-based platform from the communications device.

3. The method according to claim 1, wherein at least a part of the first area is located outside network coverage of the second area.

4. The method according to claim 1, wherein the space-based platform moves between the first area and the second area.

5. The method according to claim 1, wherein the first information comprises information received by the MTC device from at least one other MTC device.

6. The method according to claim 1, wherein the first area includes a plurality of sub-areas, a plurality of space-based platforms including the space-based platform are disposed in the first area and correspond to the plurality of sub-areas, and each space-based platform is responsible for establishing communication connections with MTC devices in the corresponding sub-area.

7. The method according to claim 1, wherein the space-based platform includes a balloon disposed in the air in a relatively fixed position, and does not move between the first area and the second area.

8. The method according to claim 1, wherein the MTC device sends the first information at a same time interval.

9. The method according to claim 1, wherein the MTC device sends the first information at different time intervals.

10. A communication method, wherein the method comprises:
    establishing, by a space-based platform, a communication connection with a machine type communications (MTC) device based on a preset time rule, wherein the preset time rule comprises a time interval at which the MTC device sends first information, wherein the preset time rule is known to both the MTC device and the space-based platform before the space-based platform establishes the communication connection with the MTC device, and wherein the MTC device is located in a first area and supports a massive machine type communications (mMTC) service;
    receiving, by the space-based platform, the first information from the MTC device; and
    sending, by the space-based platform, the first information to a communications device, wherein the communications device is located in a second area.

11. The method according to claim 10, wherein the method further comprises:
    receiving, by the space-based platform, second information from the communications device; and
    sending, by the space-based platform, the second information to the MTC device.

12. The method according to claim 10, wherein at least a part of the first area is located outside network coverage of the second area.

13. The method according to claim 10, wherein the space-based platform moves between the first area and the second area.

14. The method according to claim 13, wherein the space-based platform is any one of a balloon, a glider, an airship, and a helicopter.

15. The method according to claim 14, wherein the method further comprises:
    moving, by the space-based platform, to the first area based on the preset time rule.

16. The method according to claim 10, wherein the space-based platform moves under control of a space-based platform control station.

17. The method according to claim 16, wherein:
    the sending, by the space-based platform, the first information to a communications device comprises:
    sending, by the space-based platform, the first information to the space-based platform control station, wherein the space-based platform control station forwards the first information to the communications device; and
    the receiving, by the space-based platform, second information from the communications device comprises:
    receiving, by the space-based platform, the second information from the space-based platform control station, wherein the space-based platform control station stores the second information received from the communications device.

18. A machine type communications (MTC) apparatus, wherein the apparatus comprises:
- at least one processor; and
- at least one memory coupled to the at least one processor and storing programming instructions for execution by the at least one processor to perform operations comprising:
- establishing a communication connection with a space-based platform based on a preset time rule, wherein the preset time rule comprises a time interval at which the MTC apparatus sends first information, wherein the preset time rule is known to both the MTC apparatus and the space-based platform before the MTC apparatus establishes the communication connection with the space-based platform, and wherein the apparatus is located in a first area and supports a massive machine type communications (mMTC) service; and
- sending the first information to the space-based platform, wherein the space-based platform sends the first information to a communications device located in a second area.

19. The apparatus according to claim 18, wherein the operations further comprise:
- receiving second information from the space-based platform, wherein the second information is received by the space-based platform from the communications device.

20. The apparatus according to claim 18, wherein at least a part of the first area is located outside network coverage of the second area.

* * * * *